United States Patent
Kubo et al.

(10) Patent No.: US 12,421,363 B2
(45) Date of Patent: Sep. 23, 2025

(54) WHITE EASY-ADHESIVE POLYESTER FILM COMPRISING A NITROGEN-CONTAINING ANTISTATIC AGENT

(71) Applicant: TOYOBO CO., LTD., Osaka (JP)

(72) Inventors: Takeshi Kubo, Otsu (JP); Eiji Kumagai, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 450 days.

(21) Appl. No.: 17/910,303

(22) PCT Filed: Mar. 1, 2021

(86) PCT No.: PCT/JP2021/007656
§ 371 (c)(1),
(2) Date: Sep. 8, 2022

(87) PCT Pub. No.: WO2021/182150
PCT Pub. Date: Sep. 16, 2021

(65) Prior Publication Data
US 2023/0120617 A1    Apr. 20, 2023

(30) Foreign Application Priority Data
Mar. 9, 2020    (JP) .................................. 2020-039747

(51) Int. Cl.
*B32B 27/36*    (2006.01)
*B29C 48/00*    (2019.01)
(Continued)

(52) U.S. Cl.
CPC ............ *C08J 7/0427* (2020.01); *B29C 48/022* (2019.02); *B32B 27/36* (2013.01); *C08J 5/18* (2013.01);
(Continued)

(58) Field of Classification Search
CPC ......... B32B 27/08; B32B 27/18; B32B 27/36; B32B 27/40; B32B 2307/728; C08J 7/044;
(Continued)

(56) References Cited

U.S. PATENT DOCUMENTS

| 2006/0035070 A1 | 2/2006 | Kitazawa et al. |
| 2012/0164456 A1 | 6/2012 | Seo et al. |

(Continued)

FOREIGN PATENT DOCUMENTS

| CN | 1697854 A | 11/2005 |
| CN | 102639615 A | 8/2012 |

(Continued)

OTHER PUBLICATIONS

Translation JP 2004/223714 A (Year: 2004).*
Japan Patent Office, International Search Report in International Patent Application No. PCT/JP2021/007656 (May 11, 2021).

*Primary Examiner* — Hoa (Holly) Le
(74) *Attorney, Agent, or Firm* — Leydig, Voit & Mayer, Ltd.

(57) ABSTRACT

A readily adhesive white polyester film comprising a polyester film substrate and a coating layer on at least one surface of the polyester film substrate,
the coating layer comprising a cationic antistatic agent containing nitrogen, a polyester resin, and a polyurethane resin,
the proportion A (at %) of nitrogen derived from the antistatic agent and the proportion B (at %) of nitrogen derived from the polyurethane resin based on surface element distribution measurement by X-ray photoelectron spectroscopy in the coating layer satisfying the following formulas (i) and (ii), and
(Continued)

a surface of the coating layer having a contact angle with respect to water of 50° to 70°:

$$A \text{ (at \%)} > 0.4 \quad \text{(i)}$$

$$2.0 \leq B/A \leq 5.0. \quad \text{(ii)}$$

2 Claims, 1 Drawing Sheet

(51) Int. Cl.
*C08J 5/18* (2006.01)
*C08J 7/04* (2020.01)
*C08K 3/36* (2006.01)
*C08K 5/19* (2006.01)

(52) U.S. Cl.
CPC ............... *C08K 3/36* (2013.01); *C08K 5/19* (2013.01); *C08J 2367/00* (2013.01); *C08J 2375/04* (2013.01); *C08K 2201/005* (2013.01)

(58) Field of Classification Search
CPC ............ C08K 3/017; C08K 3/28; C08K 3/36; C08K 2201/017
See application file for complete search history.

(56) References Cited

U.S. PATENT DOCUMENTS

| | | |
|---|---|---|
| 2012/0315488 A1 | 12/2012 | Shidoji et al. |
| 2013/0236731 A1 | 9/2013 | Hayashizaki |
| 2014/0030519 A1* | 1/2014 | Morimoto ............... C09J 7/385 428/356 |
| 2015/0079405 A1 | 3/2015 | Nangou et al. |
| 2015/0166751 A1 | 6/2015 | Fukumoto et al. |
| 2015/0259490 A1 | 9/2015 | Jeong et al. |
| 2016/0260360 A1 | 9/2016 | Ueda et al. |
| 2019/0055410 A1 | 2/2019 | Iseda et al. |

FOREIGN PATENT DOCUMENTS

| | | | | |
|---|---|---|---|---|
| CN | 102673073 A | | 9/2012 | |
| CN | 102781659 A | | 11/2012 | |
| CN | 103180372 A | | 6/2013 | |
| CN | 104245830 A | | 12/2014 | |
| CN | 104379340 A | | 2/2015 | |
| CN | 104684976 A | | 6/2015 | |
| CN | 105555849 A | | 5/2016 | |
| CN | 105722900 A | | 6/2016 | |
| CN | 106908881 A | | 6/2017 | |
| CN | 107722214 A | * | 2/2018 | ............ C08G 18/08 |
| CN | 108699392 A | | 10/2018 | |
| CN | 109476864 A | | 3/2019 | |
| JP | H08-143691 A | | 6/1996 | |
| JP | H11-105221 A | | 4/1999 | |
| JP | H11-216793 A | | 8/1999 | |
| JP | 2001-060257 A | | 3/2001 | |
| JP | 2001-348450 A | | 12/2001 | |
| JP | 2003-175579 A | | 6/2003 | |
| JP | 2003-246023 A | | 9/2003 | |
| JP | 2003-246033 A | | 9/2003 | |
| JP | 2004223714 A | * | 8/2004 | |
| JP | 2007-118224 A | | 5/2007 | |
| JP | 2011-156848 A | | 8/2011 | |
| JP | 2011-184627 A | | 9/2011 | |
| JP | 2012-218309 A | | 11/2012 | |
| JP | 2018-154111 A | | 10/2018 | |
| KR | 10-2013-0041858 A | | 4/2013 | |
| KR | 2014-0123699 A | | 10/2014 | |
| WO | WO 2010/090422 A1 | | 8/2010 | |
| WO | WO 2018/004288 A2 | | 1/2018 | |
| WO | WO 2019/059329 A1 | | 3/2019 | |

* cited by examiner

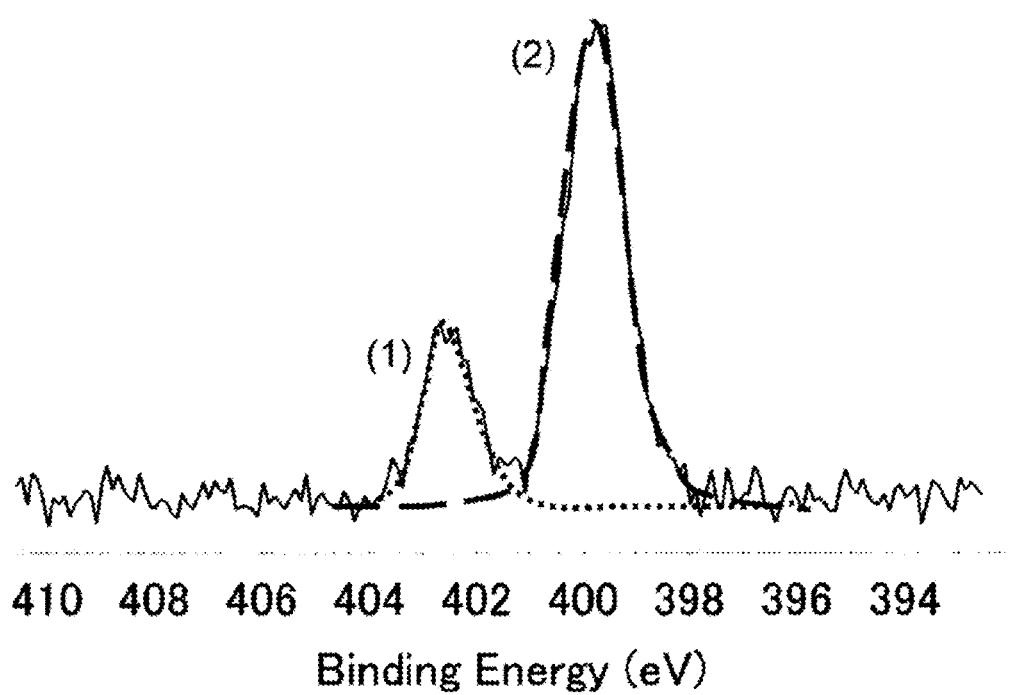

WHITE EASY-ADHESIVE POLYESTER FILM COMPRISING A NITROGEN-CONTAINING ANTISTATIC AGENT

TECHNICAL FIELD

The present invention relates to a readily adhesive white polyester film. More specifically, the present invention relates to a readily adhesive white polyester film that achieves both antistatic properties and adhesion to various inks and toners, in particular, good adhesion to ultraviolet (UV)-curable inks during high-speed printing.

BACKGROUND ART

Biaxially stretched polyester films, which have excellent properties such as mechanical properties, electrical properties, and dimensional stability, have been used as a substrate film in many fields of, for example, magnetic recording materials, packaging materials, electrically insulating materials, photosensitive materials, drawing materials, and photographic materials. However, in general, in such uses, when an ink or the like is coated on a biaxially stretched polyester film, adhesion may be insufficient depending on the material used (for example, see Patent Literature (PTL) 1).

A known method for imparting adhesion to the surface of a biaxially stretched polyester film comprises applying a coating liquid containing various resin components to the polyester film before completion of crystal orientation, drying the coating liquid, stretching the resulting film in at least one direction, and performing heat treatment to complete crystal orientation, thereby forming a readily adhesive coating layer.

In terms of various conventional polyester-based coating films for ink adhesion as well, many methods can be found in which a coating layer formed of a specific resin is provided on the surface of the substrate polyester film. The resin constituting the coating layer may be, for example, a single resin selected from a polyester resin, a polyurethane resin, and an acrylic resin; a mixture of two or more of these resins; or a mixture of one or more of these resins with a specific crosslinking agent (e.g., melamines and isocyanates).

However, in general, substrate polyester films and readily adhesive polyester films with a coating layer provided to improve adhesion are prone to electrostatic charge, and may have problems related to processability in the film formation step or a static electricity problem in the processing step (for example, see PTL 2).

A known method for addressing the problem caused by static electricity comprises incorporating a conductive polymer (e.g., polyanilines or polypyrroles), carbon black in particulate form, a metal powder (e.g., nickel or copper), a metal oxide (e.g., tin oxide or zinc oxide), fibrous brass, fibers coated with metal (e.g., stainless steel or aluminum), or a conductive filler (e.g., flake graphite, aluminum flakes, or copper flakes) into a coating layer to impart antistatic properties to the coating layer.

However, in general, such conductive polymers, metal oxides, fibers coated with metal, and conductive fillers may not produce sufficient antistatic effects unless they are added in large amounts to the coating layer. Moreover, the addition of these components in large amounts may result in insufficient adhesion of the coating layer to inks and toners. Furthermore, the above method has problems such as coloration of the film, and a cost increase due to the high cost of conductive substances. The method is also problematic in that when the substrate film is stretched, it may be difficult for the film to follow the stretch; and the coating film may have cracks etc., which deteriorates the quality of the coating film.

Another known method for addressing the problem caused by static electricity comprises incorporating a polymer-based antistatic agent having at least one sulfonic acid salt group or phosphoric acid salt group in the molecule into a coating liquid, and applying the resulting coating liquid to a substrate film (for example, see PTL 3).

In order to achieve a sufficient antistatic effect with the polymer-based antistatic agent, it is necessary to increase the number average molecular weight of the antistatic agent, or increase the amount of the antistatic agent added to the coating layer. However, in general, neither of these methods provides an advantage in terms of adhesion of the coating layer to inks and toners.

In the printing industry, the printing speed has been recently increased to improve productivity. Speeding up printing by using UV-curable inks reduces the time required from ink application to UV irradiation and the integrated UV light amount. That is, the interactions between the inks, the polyester film, and the coating layer are weakened. Thus, the coating layer is required to have higher adhesion to UV-curable inks.

CITATION LIST

Patent Literature

PTL 1: JP2004-223714A
PTL 2: JP2001-348450A
PTL 3: JP2011-156848A

SUMMARY OF INVENTION

Technical Problem

The present invention was made in view of the above problems of the prior art. Specifically, an object of the present invention is to provide a readily adhesive white polyester film that achieves both antistatic properties and adhesion to inks and toners, in particular, good adhesion to UV-curable inks during high-speed printing.

Solution to Problem

To achieve the above object, the present inventors investigated causes etc. of the above problems and accomplished the present invention. Specifically, the present invention includes the following.

1. A readily adhesive white polyester film comprising a polyester film substrate and a coating layer on at least one surface of the polyester film substrate,
   the coating layer comprising a cationic antistatic agent containing nitrogen, a polyester resin, and a polyurethane resin,
   the proportion A (at %) of nitrogen derived from the antistatic agent and the proportion B (at %) of nitrogen derived from the polyurethane resin based on surface element distribution measurement by X-ray photoelectron spectroscopy in the coating layer satisfying the following formulas (i) and (ii), and a surface of the coating layer having a contact angle with respect to water of 50° to 70°:

$$A \text{ (at \%)} > 0.4 \tag{i}$$

$$2.0 \leq B/A \leq 5.0. \tag{ii}$$

2. The readily adhesive white polyester film according to Item 1, wherein the polyester film substrate comprises inorganic particles and/or a thermoplastic resin that is incompatible with polyester resin.

Advantageous Effects of Invention

The present invention can provide a readily adhesive white polyester film that achieves both antistatic properties and adhesion to inks and toners, in particular, good adhesion to UV-curable inks during high-speed printing.

BRIEF DESCRIPTION OF DRAWINGS

FIG. 1 is an illustration showing how to obtain the proportion A (at %) of nitrogen derived from the antistatic agent and the proportion B (at %) of nitrogen derived from the polyurethane resin in the coating layer of the present invention based on surface element distribution measurement by X-ray photoelectron spectroscopy.

DESCRIPTION OF EMBODIMENTS

Polyester Film Substrate

In the present invention, the polyester resin forming the polyester film substrate is, for example, polyethylene terephthalate, polybutylene terephthalate, polyethylene-2,6-naphthalate, polytrimethylene terephthalate, or a copolyester resin in which a portion of the diol component or dicarboxylic acid component of a polyester resin described above is replaced by a copolymerization component. Examples of copolymerization components include diol components, such as diethylene glycol, neopentyl glycol, 1,4-cyclohexanedimethanol, and polyalkylene glycol; dicarboxylic acid components, such as adipic acid, sebacic acid, phthalic acid, isophthalic acid, 5-sodium isophthalic acid, and 2,6-naphthalenedicarboxylic acid; and the like.

The polyester resin preferably used for the polyester film substrate in the present invention is mainly selected from polyethylene terephthalate, polytrimethylene terephthalate, polybutylene terephthalate, and polyethylene-2,6-naphthalate. Among these polyester resins, polyethylene terephthalate is most preferred in terms of the balance between physical properties and cost. The polyester film substrate formed from such a polyester resin is preferably a biaxially stretched polyester film, and can improve chemical resistance, heat resistance, mechanical strength, stiffness, and the like.

The catalyst for polycondensation used in the production of the polyester resin is not particularly limited. Antimony trioxide is suitable because it is an inexpensive catalyst with excellent catalytic activity. It is also preferable to use a germanium compound or a titanium compound. More preferred examples of polycondensation catalysts include a catalyst containing aluminum and/or a compound thereof, and a phenolic compound; a catalyst containing aluminum and/or a compound thereof, and a phosphorus compound; and a catalyst containing an aluminum salt of a phosphorus compound.

The substrate polyester film used in the present invention may have a single-layer structure or a multilayer structure.

It is preferable that some or all of the layers are opaque. The optical density representing the opacity of the polyester film is 0.3 or more, preferably 0.3 to 4.0, and particularly preferably 0.5 to 3.0. An optical density of 0.3 or more is preferred to achieve a clearer printing effect when printing is applied to the surface of the resulting polyester-based coating film. Further, an optical density of 4.0 or less is preferred since a better printing effect can be expected.

The method of obtaining an optical density within the above ranges is not particularly limited. The optical density within the above ranges can be preferably obtained by using a polyester resin that contains inorganic particles or a thermoplastic resin that is incompatible with the polyester resin. The contents thereof are not particularly limited. The content of inorganic particles, if contained, is preferably 5 to 35 mass %, and particularly preferably 8 to 25 mass %, of the polyester. The content of the incompatible thermoplastic resin, if contained, is preferably 5 to 35 mass %, and particularly preferably 8 to 28 mass %, of the polyester. The total amount of inorganic particles and a thermoplastic resin that is incompatible with polyester resin, when these are used in combination, is preferably 40 mass % or less of the polyester film, in terms of film strength and stiffness, and to stably form a film.

The substrate polyester film in the present invention may have a single-layer structure or a laminated structure. In a preferred embodiment, the substrate polyester film has a laminated structure comprising layer X, layer Y, and layer X in this order, wherein layer X contains inorganic particles, and layer Y contains fine cavities. The use of layer X, which contains inorganic particles, as the surface layers can improve sliding properties, i.e., handling properties, of the film, as well as concealment properties. Further, the presence of fine cavities only in layer Y, which is the inner layer, can ensure sufficient strength of the film surface while achieving cushioning properties of the film. The method of forming the laminated structure is not particularly limited. A method that involves coextrusion is preferred from the standpoint of stability during production and processing costs.

The content of inorganic particles in each layer X is preferably 2.5 to 70.0 mass %, particularly preferably 4.0 to 60.0 mass %, and further particularly preferably 6.0 to 50.0 mass %, of the polyester. The content of the incompatible thermoplastic resin in layer Y is preferably 5 to 35 mass %, and particularly preferably 8 to 28 mass %, of the polyester.

The thickness ratio of the layers in the laminated structure comprising layer X, layer Y, and layer X in this order is preferably within the range of 0.5/9/0.5 to 2/6/2, and more preferably 1/8/1 to 1.5/7/1.5, in terms of film strength and stiffness, and to stably form a film.

The inorganic particles for use are not particularly limited. The inorganic particles preferably have an average particle size of 0.1 to 4.0 μm, and particularly preferably 0.3 to 1.5 μm. Specifically, white pigments, such as titanium oxide, barium sulfate, calcium carbonate, and zinc sulfide are preferred, and these may be used in combination. Further, inorganic particles commonly incorporated in films, such as silica, alumina, talc, kaolin, clay, calcium phosphate, mica, hectorite, zirconia, tungsten oxide, lithium fluoride, calcium fluoride, and calcium sulfate, may also be used in combination.

The thermoplastic resin that is incompatible with polyester resin is not particularly limited. For example, to mix with a polyethylene terephthalate resin, examples of the thermoplastic resin that is incompatible with polyester resin include polyolefin resins, such as polystyrene resin, polyethylene resin, polypropylene resin, and polymethylpentene resin, cyclic polyolefin resin, acrylic resin, phenoxy resin, polyphenylene oxide resin, polycarbonate resin, and the like. These thermoplastic resins may be a mixture, and may be modified. Of course, these thermoplastic resins can be used in combination with the inorganic particles mentioned above. Additionally, of course, various whitening agents may be added as necessary. Furthermore, the polyester film used in the present invention is preferably a fine-cavity-containing polyester film having an apparent density of 0.3 to 1.3 g/cm$^3$.

The fine-cavity-containing polyester film also preferably has a density of layered cavities of 0.20 cavities/μm or more, preferably 0.25 cavities/μm or more, and more preferably 0.30 cavities/μm or more, in terms of achieving both cushioning properties and surface peel strength. Within these ranges, the resulting polyester-based coating film achieves excellent printing clarity and excellent processing characteristics during printing. The density of layered cavities (cavities/μm) as used herein is defined according to the following formula: layered cavities in the thickness direction of the film (cavities)/film thickness (μm). The upper limit of the density of layered cavities is preferably 0.80 cavities/μm, and more preferably 0.55 cavities/μm, in terms of efficiency in cavity expression. The density may be adjusted to be within the above ranges by adjusting the amount, type, and viscosity, etc. of the incompatible thermoplastic resin to be added, changing the screw shape of an extruder, installing a static mixer in a molten resin flow path, or the like, without limitation.

The fine-cavity-containing polyester film is particularly useful because the fine cavities present in the film cause light scattering at the interface with the polyester matrix, thus further increasing opacity. This makes it possible to reduce the amount of the inorganic particles to be added. In addition, the presence of fine cavities can make the substrate film itself lighter; thus, handling becomes easier, and greater economic effects, such as a reduction in costs for starting materials and transportation, are achieved.

The fine-cavity-containing polyester film as described above may be obtained by known methods that have already been published, such as a method comprising kneading a thermoplastic polyester resin that serves as a matrix with a thermoplastic resin that is incompatible with the polyester resin, and stretching, in at least one axial direction, a sheet obtained by dispersing the incompatible resin in the form of fine particles in the polyester resin to thus form cavities around the fine particles of the incompatible resin.

The resulting fine-cavity-containing polyester film preferably has a thickness of 5 to 300 μm. The thickness of the fine-cavity-containing polyester film is more preferably 20 to 300 μm, and even more preferably 40 to 250 μm.

The whiteness required when the film is used for printing materials etc. can be represented by a color b-value. A higher color b-value represents a stronger yellow color, whereas a lower value represents a stronger blue color. The color b-value corresponds well to visual confirmation, and is preferably 4.0 or less, and more preferably 3.0 or less. A b-value of 4.0 or less achieves excellent whiteness, and achieves excellent printing clarity when the film is used for labels etc. The lower limit of the color b-value is preferably −5.0. When the b-value is −5.0 or more, the film does not become overly blue, and can achieve well-balanced resolution when used as a printing substrate.

Explanation of Characteristic Values in Present Invention

The readily adhesive white polyester film of the present invention preferably comprises a coating layer on at least one surface of the polyester film substrate described above, the coating layer comprising a cationic antistatic agent containing nitrogen, a polyester resin, and a polyurethane resin. Allowing the cationic antistatic agent component and the polyurethane resin component to be present at the surface of the coating layer in suitable amounts and proportions, and controlling the contact angle with respect to water within a suitable range achieve both antistatic properties and adhesion to inks and toners, in particular, good adhesion to UV-curable inks during high-speed printing.

The amounts of the cationic antistatic agent component and the polyurethane resin component at the surface of the coating layer are evaluated by the peak areas of an ionized nitrogen peak and a non-ionized nitrogen peak in an Nis spectrum by X-ray photoelectron spectroscopy (hereinafter referred to as "ESCA"), respectively. In ESCA, elemental species corresponding to peaks, and their chemical states are identified from the positions of the peaks in an actual measurement spectrum. Further, curve-fitting can be performed on the elemental peaks to calculate peak areas. The coating layer of the present invention comprises a cationic antistatic agent containing nitrogen, and a polyurethane resin. FIG. 1 shows an example of peaks in an Nis spectrum of the coating layer by ESCA. In FIG. 1, the thin solid line shows actual measurement data of the Nis spectrum. Of the two peaks, (1) the peak near 402 eV represented by the dotted curve in FIG. 1 is an ionized nitrogen peak, which can be determined to be derived from the cationic antistatic agent in the present invention. Further, (2) the peak near 400 eV represented by the dashed curve in FIG. 1 is a non-ionized nitrogen peak, which can be determined to be derived from the polyurethane resin in the present invention. When curve-fitting is performed on the peaks in spectra of all elements detected, including the Nis spectrum, and the total peak area is taken as 100 (at %), the percentage of the area of (1) is expressed as the proportion A (at %) of nitrogen derived from the cationic antistatic agent, which is an index of the amount of the antistatic agent component at the surface of the coating layer. Similarly, the percentage of the area of (2) is expressed as the proportion B (at %) of nitrogen derived from the polyurethane resin, which is an index of the amount of the polyurethane resin component at the surface of the coating layer.

When the characteristic values of the coating layer of the present invention based on surface element distribution measurement by ESCA satisfy the following relationships (i) and (ii), and the surface of the coating layer has a contact angle with respect to water of 50° to 70°, antistatic properties and adhesion to inks and toners are both achieved; and, in particular, good adhesion to UV-curable inks during high-speed printing is achieved.

$$A \text{ (at \%)} > 0.4 \tag{i}$$

$$2.0 \leq B/A \leq 5.0 \tag{ii}$$

The principle of antistatic properties exhibited when an ionic antistatic agent, including the cationic antistatic agent of the present invention, is used, and the correlation with adhesion to inks and toners are described below. When an ionic antistatic agent is used to exhibit antistatic properties on the surface of a substrate, it is preferable to form a network of water, which serves to dissipate static electricity, on the surface of the substrate. Ionic antistatic agents present at the surface of a substrate have the effect of attracting moisture in the air. Thus, the larger the amount of ionic antistatic agent at the surface of a substrate, the more easily the moisture in the air is attracted, and the more easily a network of water is formed; as a result, antistatic properties are more easily exhibited. On the other hand, as the amount of ionic antistatic agent at the surface of a substrate increases, the amount of resin relatively decreases. This means that in the present invention, the amount of urethane resin, which is generally considered important in adhesion to inks and toners, decreases, resulting in reduced adhesion. It is thus preferable to control the amount of ionic antistatic agent and the amount of resin (in particular, polyurethane resin) at the surface of the coating layer within suitable ranges. In order to form a network of water even when the amount of ionic antistatic agent at the surface of the coating layer is small, it is preferable to control the contact angle of the surface of the coating layer with respect to water. By controlling the contact angle of the surface of the coating layer within a suitable range, moisture attracted by the antistatic agent at the surface of the coating layer can be spread to areas where the antistatic agent is not present. That is, controlling the contact angle of the surface of the coating layer can assist in the formation of a network of water. Therefore, good antistatic properties can be obtained even with a smaller amount of antistatic agent. Since the effect of assisting in the formation of a network of water is obtained, the contact conditions between an ink or toner and the polyurethane resin component at the surface of the coating layer become suitable by suppressing the spread of excess water.

A (at %) is preferably greater than 0.4. Controlling A (at %) within this range can attract moisture in the air to the surface of the coating film. Good antistatic properties can be obtained by controlling the contact angle of the surface of the coating layer with respect to water described below within a suitable range. A (at %) is more preferably 0.5 at % or more, and even more preferably 0.6 at % or more. However, if A (at %) is too high, it is difficult to satisfy the preferred range of B/A described below. Thus, A (at %) is preferably 5 at % or less, more preferably 3 at % or less, and even more preferably 2 at % or less.

B/A is preferably 2.0 to 5.0. By controlling B/A within this range and controlling the contact angle of the surface of the coating film with respect to water described below within a suitable range, antistatic properties and adhesion to inks and toners are both achieved; and, in particular, good adhesion to UV-curable inks during high-speed printing is achieved. The lower limit of B/A is more preferably 3.0 or more. The upper limit of B/A is more preferably 4.0 or less.

The contact angle of the surface of the coating film with respect to water is preferably within the range of 50° to 70°. The lower limit of the contact angle of the surface of the coating film with respect to water is more preferably 60° or more. The upper limit of the contact angle of the surface of the coating film with respect to water is more preferably 68° or less. Controlling the contact angle within the range of 50° to 70° provides a good effect of assisting in the formation of a network of water on the surface of the coating layer.

Coating Layer

The readily adhesive white polyester film of the present invention preferably comprises a coating layer on at least one surface of the polyester film substrate, the coating layer comprising a cationic antistatic agent containing nitrogen, a polyester resin, and a polyurethane resin, in order to achieve both antistatic properties and adhesion to inks and toners; and, in particular, to achieve good adhesion to UV-curable inks during high-speed printing. The coating layer may be formed on both surfaces of the polyester film. Alternatively, the coating layer may be formed on only one surface of the polyester film, and a different resin coating layer may be formed on the other surface.

Each of the components of the coating layer is described below in detail.

Cationic Antistatic Agent Containing Nitrogen

Examples of cationic antistatic agents containing nitrogen include polyethylenimine, polydimethyldiallyl ammonium salts, polyalkylenepolyaminedicyanodiamido ammonium condensates, polyvinylpyridinium halides, alkyl quaternary ammonium salts of (meta) acrylic acid, alkyl quaternary ammonium salts of (meta)acrylamide, ω-chloro-poly(oxyethylene-polymethylene-alkyl quaternary ammonium salts), polyvinylbenzyltrimethylammonium salts, polystyrene-based cationic polymers, poly(meth)acrylic cationic polymers (e.g., methyl methacrylate, ethyl acrylate, 2-hydroxyethyl methacrylate, and trimethylaminoethyl methacrylate chloride), polyvinylpyridine-based polymers, cyclic integral polymers, linear integral polymers, polymers of aromatic vinyl monomer having two or more quaternary ammonium ion groups in a pendant form, polymers having a pyrrolidinium ring in the main chain, and the like. These polymers may be homopolymers or copolymers. Known copolymerizable monomers can be used to produce these polymers. In terms of controlling the amount of antistatic agent component at the surface of the coating layer, the antistatic agent is preferably an antistatic agent having a linear alkyl group, and further preferably an antistatic agent having a linear alkyl group and a quaternary ammonium salt group.

In the present invention, the antistatic agent is preferably present at the surface of the coating layer.

Thus, in the antistatic agent having a linear alkyl group and a quaternary ammonium salt group, the number of carbon atoms in the alkyl chain is preferably 10 to 20, more preferably 12 to 19, and particularly preferably 14 to 18. In order to control the proportion of nitrogen derived from the cationic antistatic agent containing nitrogen based on surface element distribution measurement by ESCA within the suitable range, it is preferable to allow the antistatic agent to bleed out on the surface of the coating layer. In view of the interaction between the above molecules and the ease of bleeding out due to the molecular length, the above ranges are preferred.

Further, in the molecular structure of the cationic antistatic agent containing nitrogen, at least one amide bond, urethane bond, or the like may be contained between the linear alkyl chain and the quaternary ammonium salt group.

In the above antistatic agent, the counterion of the quaternary ammonium salt group is not particularly limited as long as it is an anionic compound. The counterion of the quaternary ammonium salt group can be preferably suitably selected from halogen ions, mono- or poly-halogenated alkyl ions, nitrate ions, sulfate ions, alkyl sulfate ions, sulfonate ions, or alkyl sulfonate ions. More preferably, a chloride ion, a methanesulfonate ion, an ethanesulfonate ion, or a nitrate ion is selected.

Polyester Resin

The polyester resin used to form the coating layer in the present invention may be linear; however, it is preferably a polyester resin containing a dicarboxylic acid and a diol having a branched structure as constituents. Examples of the dicarboxylic acid that mainly constitutes the polyester resin include terephthalic acid, isophthalic acid, and 2,6-naphthalenedicarboxylic acid. Other examples thereof include aliphatic dicarboxylic acids, such as adipic acid, and sebacic acid; and aromatic dicarboxylic acids, such as terephthalic acid, isophthalic acid, phthalic acid, and 2,6-naphthalenedicarboxylic acid. The branched glycol is a branched alkyl group-containing diol. Examples include 2,2-dimethyl-1,3-propanediol, 2-methyl-2-ethyl-1,3-propanediol, 2-methyl-2-butyl-1,3-propanediol, 2-methyl-2-propyl-1,3-propanediol, 2-methyl-2-isopropyl-1,3-propanediol, 2-methyl-2-n-hexyl-1,3-propanediol, 2,2-diethyl-1,3-propanediol, 2-ethyl-2-n-butyl-1,3-propanediol, 2-ethyl-2-n-hexyl-1,3-propanediol, 2,2-di-n-butyl-1,3-propanediol, 2-n-butyl-2-propyl-1,3-propanediol, 2,2-di-n-hexyl-1,3-propanediol, and the like.

As the dicarboxylic acid, which is a constituent of the polyester resin, terephthalic acid or isophthalic acid is preferable. In addition to the above dicarboxylic acids, it is preferable to use 5-sulfoisophthalic acid or the like in the range of 1 to 10 mol % for copolymerization, in order to impart water dispersibility to the copolyester resin. Examples include sulfoterephthalic acid, 5-sulfoisophthalic acid, 5-sodium sulfoisophthalic acid, and the like. A polyester resin containing a dicarboxylic acid with a naphthalene skeleton may be used; however, in order to suppress a decrease in adhesion to curable inks, the amount thereof is preferably 5 mol % or less of the entire carboxylic acid component, or the dicarboxylic acid with a naphthalene skeleton may not be used.

The polyester resin may contain a triol or tricarboxylic acid as a constituent thereof in the range in which the characteristics of the polyester resin are not impaired.

The polyester resin may contain a polar group other than carboxyl. Examples of polar groups include a sulfonic acid metal salt group, a phosphate group, and the like. The polyester resin may contain one or more of these polar groups. An example of the method of introducing a sulfonic acid metal salt group is a method in which a dicarboxylic acid or glycol containing a sulfonic acid metal salt group, such as a metal salt of 5-sulfoisophthalic acid, 4-sulfonaphthalene-2,7-dicarboxylic acid, 5[4-sulfophenoxy]isophthalic acid, or the like or a metal salt of 2-sulfo-1,4-butanediol, 2,5-dimethyl-3-sulfo-2,5-hexanediol, or the like, is used in an amount of 10 mol % or less, preferably 7 mol % or less, and more preferably 5 mol % or less of the total polycarboxylic acid component or the total polyol component. If the content exceeds 10 mol %, the hydrolysis resistance of the resin itself and the water resistance of the coating film tend to decrease.

Polyurethane Resin

In the present invention, it is preferred that the antistatic agent is present at the surface of the coating layer, that the characteristic values based on surface element distribution measurement by ESCA satisfy the suitable relationships, and that the contact angle of the surface of the coating layer with respect to water is within the suitable range. It is thus preferable to mainly control the polarity of the polyurethane resin.

An example of the method of controlling the polarity of the polyurethane resin is a method comprising controlling the structure of the polyol component used to synthesize and polymerize the polyurethane resin. In general, an ester skeleton and a carbonate skeleton tends to be less polar than an ether skeleton. When the proportion of nitrogen derived from the cationic antistatic agent based on surface element distribution measurement by ESCA is less than the suitable range, it is preferable to use a urethane resin in which the skeleton of the polyol component used to synthesize and polymerize the polyurethane resin is an ester skeleton or a carbonate skeleton, in order to reduce the interaction between the polyurethane resin and the cationic antistatic agent and to allow the antistatic agent to be present at the surface of the coating layer. It is particularly preferable to use a urethane resin in which the skeleton of the polyol component is a carbonate skeleton Examples of polyols with an ether skeleton include polyethylene glycol, polypropylene glycol, polytetramethylene glycol, polytetramethylene ether glycol, polyhexamethylene ether glycol, and the like.

Examples of polyols with an ester skeleton include those obtained by reacting polycarboxylic acids (e.g., malonic acid, succinic acid, glutaric acid, adipic acid, pimelic acid, suberic acid, sebacic acid, fumaric acid, maleic acid, terephthalic acid, and isophthalic acid) or anhydrides thereof, with polyhydric alcohols (e.g., ethylene glycol, diethylene glycol, triethylene glycol, propylene glycol, dipropylene glycol, tripropylene glycol, butanediol, 1,3-butanediol, 1,4-butanediol, 2,3-butanediol, 2-methyl-1,3-propanediol, 1,5-pentanediol, neopentyl glycol, 1,6-hexanediol, 3-methyl-1,5-pentanediol, 2-methyl-2,4-pentanediol, 2-methyl-2-propyl-1,3-propanediol, 1,8-octanediol, 2,2,4-trimethyl-1,3-pentanediol, 2-ethyl-1,3-hexanediol, 2,5-dimethyl-2,5-hexanediol, 1,9-nonanediol, 2-methyl-1,8-octanediol, 2-butyl-2-ethyl-1,3-propanediol, 2-butyl-2-hexyl-1,3-propanediol, cyclohexanediol, bishydroxymethyl cyclohexane, dimethanolbenzene, bishydroxyethoxybenzene, alkyldialkanolamine, and lactone diol), and the like.

The polyol with a carbonate skeleton preferably comprises an aliphatic polycarbonate polyol having excellent heat resistance and excellent hydrolysis resistance. Examples of the aliphatic polycarbonate polyol include aliphatic polycarbonate diols, aliphatic polycarbonate triols, and the like. Preferably, aliphatic polycarbonate diols can be used. Examples of aliphatic polycarbonate diols that can be used to synthesize and polymerize the urethane resin with a polycarbonate structure in the present invention include aliphatic polycarbonate diols obtained by reacting one or more diols, such as ethylene glycol, propylene glycol, 1,3-propanediol, 1,4-butanediol, 1,5-pentanediol, 3-methyl-1,5-pentanediol, 1,6-hexanediol, 1,9-nonanediol, 1,8-nonanediol, neopentyl glycol, diethylene glycol, and dipropylene glycol, with, for example, a carbonate, such as dimethyl carbonate, ethylene carbonate, or phosgene; and the like.

Another example of the method for controlling the polarity of the polyurethane resin is a method comprising controlling the number average molecular weight of the polyol component used to synthesize and polymerize the polyurethane resin. In general, the higher the number average molecular weight of the polyol component used to synthesize and polymerize the polyurethane resin, the less polar the polyurethane resin tends to be. On the other hand, the lower the number average molecular weight of the polyol component, the more polar the polyurethane resin tends to be. For example, when the contact angle of the surface of the coating layer with respect to water is less than the suitable range, it is preferable to increase the number average molecular weight of the polyol component to make the polyurethane resin less polar. For example, when the contact angle of the surface of the coating layer with respect to water exceeds the suitable range, it is preferable to reduce the number average molecular weight of the polyol component to make the polyurethane resin more polar. When the polyol used to synthesize and polymerize the polyurethane resin is a polyol with an ester skeleton, the number average molecular weight of the polyol component is, for example, preferably 1000 to 2400, more preferably 1200 to 2200, and particularly preferably 1400 to 2200. When the polyol is a polyol with a carbonate skeleton, the number average molecular weight of the polyol component is, for example, preferably 500 to 1800, more preferably 600 to 1600, and particularly preferably 700 to 1400.

Another example of the method of controlling the polarity of the polyurethane resin is a method controlling the urethane group content in the molecule. In general, as the urethane group content in the molecule increases, the polyurethane resin tends to be more polar, and the amount of the polyurethane resin component at the surface of the coating layer tends to increase. On the other hand, as the urethane group content in the molecule decreases, the polyurethane resin tends to be less polar, and the amount of the polyurethane resin component at the surface of the coating layer tends to decrease. Thus, the amount of the antistatic agent component at the surface of the coating layer, the amount of the polyurethane resin component at the surface of the coating layer, and further, the contact angle of the surface of the coating layer with respect to water are changed in parallel by controlling the urethane group content in the molecule. To allow the characteristic values based on surface element distribution measurement by ESCA and the contact angle of the surface of the coating layer with respect to water to fall within the suitable ranges in the present invention, for example, the urethane group content in the molecule (number average molecular weight of isocyanate component used to synthesize and polymerize polyurethane resin/number average molecular weight of polyurethane resin) is preferably 26 to 38, and more preferably 26 to 36.

The polyurethane resin in the present invention can be produced by known methods. Examples include a method comprising synthesizing an isocyanate-terminated prepolymer from a polyol and an excess of a polyisocyanate, and then reacting the prepolymer with a chain extender or a crosslinking agent to increase the molecular weight.

Examples of polyisocyanates that can be used to synthesize and polymerize the urethane resin in the present invention include aromatic aliphatic diisocyanates, such as xylylene diisocyanate; alicyclic diisocyanates, such as isophorone diisocyanate, 4,4-dicyclohexylmethane diisocyanate, and 1,3-bis(isocyanatomethyl)cyclohexane; aliphatic diisocyanates, such as hexamethylene diisocyanate and 2,2,4-trimethylhexamethylene diisocyanate; and polyisocyanates obtained by adding one or more of these compounds to, for example, trimethylolpropane. The aromatic aliphatic diisocyanates, alicyclic diisocyanates, aliphatic diisocyanates, and the like are preferred because there is no problem of yellowing when they are used. They are also preferred because the resulting coating film is not overly hard; the stress due to thermal shrinkage of the polyester film substrate can be relaxed; and there is no problem of, for example, cohesive failure of the coating layer.

Examples of chain extenders that can be used to synthesize and polymerize the urethane resin in the present invention include glycols, such as ethylene glycol, diethylene glycol, 1,4-butanediol, neopentyl glycol, and 1,6-hexanediol; polyhydric alcohols, such as glycerol, trimethylolpropane, and pentaerythritol; diamines, such as ethylenediamine, hexamethylenediamine, and piperazine; amino alcohols, such as monoethanolamine and diethanolamine; thiodiglycols, such as thiodiethylene glycol; and water.

The coating layer in the present invention is preferably formed by an in-line coating method described later, using a water-based coating liquid. It is thus desirable that the urethane resin of the present invention has water solubility or water dispersibility. The phrase "water solubility or water dispersibility" means dispersing in water or an aqueous solution containing a water-soluble organic solvent in an amount of less than 50 mass %.

To impart water dispersibility to the urethane resin, a sulfonic acid (salt) group or a carboxylic acid (salt) group can be introduced (copolymerized) into the urethane molecular skeleton. The polyurethane resin into which a nonionic group, such as a polyoxyalkylene group, is introduced is particularly preferred because it can reduce the interaction between the polyurethane resin and the cationic antistatic agent as much as possible.

The method of introducing a nonionic group can be appropriately selected from known methods. Examples include a method in which a portion of a polymeric polyol is replaced by a diol containing a polyoxyethylene group; and a method in which some isocyanate groups in a diisocyanate nurate are reacted with methoxypolyethylene glycol in advance, followed by a reaction with a polymeric polyol.

To introduce a carboxylic acid (salt) group into the urethane resin in the present invention, for example, a polyol compound containing a carboxylic acid group, such as dimethylolpropanoic acid or dimethylolbutanoic acid, is introduced as a polyol component (copolymerization component), and neutralization is performed using a salt-forming agent. Specific examples of salt-forming agents include ammonia; trialkylamines, such as trimethylamine, triethylamine, triisopropylamine, tri-n-propylamine, and tri-n-butylamine; N-alkylmorpholines, such as N-methylmorpholine and N-ethylmorpholine; and N-dialkylalkanolamines, such as N-dimethylethanolamine and N-diethylethanolamine. These may be used singly, or in a combination of two or more.

When a polyol compound containing a carboxylic acid (salt) group is used as a copolymerization component to impart water dispersibility, the molar percentage of the polyol compound containing a carboxylic acid (salt) group in the urethane resin is preferably within the range of 3 to 25 mol %, more preferably 3 to 18 mol %, and particularly preferably 3 to 15 mol %, based on the entire polyisocyanate component of the urethane resin taken as 100 mol %. Controlling the molar percentage within the above ranges ensures water dispersibility, suppresses the interaction with the cationic antistatic agent component, and allows the antistatic agent to be present at the surface of the coating layer.

The urethane resin of the present invention may be a self-crosslinking polyurethane resin having a blocked isocyanate bonded to one or more terminals thereof to improve toughness.

The urethane resin of the present invention may have a branched structure.

To form a branched structure in the urethane resin, for example, a method comprising reacting the polycarbonate polyol component, the polyisocyanate, and the chain extender at a suitable temperature for a suitable period of time, adding a compound containing three or more hydroxyl groups or isocyanate groups, and further allowing the reaction to proceed can be preferably adopted.

Specific examples of the compound containing three or more hydroxyl groups include caprolactone triol, glycerol, trimethylolpropane, butanetriol, hexanetriol, 1,2,3-hexanetriol, 1,2,3-pentanetriol, 1,3,4-hexanetriol, 1,3,4-pentanetriol, 1,3,5-hexanetriol, 1,3,5-pentanetriol, polyether triols, and the like. Examples of the polyether triols include compounds obtained by addition polymerization of one or more monomers, such as ethylene oxide, propylene oxide, butylene oxide, amylene oxide, glycidyl ether, methyl glycidyl ether, t-butyl glycidyl ether, and phenyl glycidyl ether, using one or more initiators (e.g., compounds having three active hydrogens, such as glycerol, trimethylolpropane, and like alcohols, and diethylenetriamine).

A specific example of the compound containing three or more isocyanate groups is a polyisocyanate compound that contains at least three isocyanate (NCO) groups per molecule. Examples of isocyanate compounds containing three or more functional groups in the present invention include biurets, nurates, and adducts obtained by modifying an isocyanate monomer having two isocyanate groups, such as an aromatic diisocyanate, aliphatic diisocyanate, aromatic aliphatic diisocyanate, or alicyclic diisocyanate. Examples of aromatic diisocyanates include 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, dianisidine diisocyanate, 4,4'-diphenyl ether diisocyanate, and the like. Examples of aliphatic diisocyanates include trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, dodecamethylene diisocyanate, 2,4,4-trimethylhexamethylene diisocyanate, and the like. Examples of aromatic aliphatic diisocyanates include xylylene diisocyanate, ω,ω'-diisocyanate-1,4-diethylbenzene, 1,4-tetramethylxylylene diisocyanate, 1,3-tetramethylxylylene diisocyanate, and the like. Examples of alicyclic diisocyanates include 3-isocyanatomethyl-3,5,5-trimethylcyclohexyl isocyanate (also known as IPDI, isophorone diisocyanate), 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexyl isocyanate), 1,4-bis(isocyanatomethyl)cyclohexane, and the like. The biuret is a self-condensate with a biuret bond formed by self-condensation of an isocyanate monomer. Examples include a biuret of hexamethylene diisocyanate, and the like. The nurate is a trimer of an isocyanate monomer. Examples include a trimer of hexamethylene diisocyanate, a trimer of isophorone diisocyanate, a trimer of tolylene diisocyanate, and the like. The adduct is an isocyanate compound containing three or more functional groups that is obtained by reacting an isocyanate monomer described above with a low-molecular-weight compound containing three or more active hydrogens. Examples include a compound obtained by reacting trimethylolpropane with hexamethylene diisocyanate, a compound obtained by reacting trimethylolpropane with tolylene diisocyanate, a compound obtained by reacting trimethylolpropane with xylylene diisocyanate, a compound obtained by reacting trimethylolpropane with isophorone diisocyanate, and the like.

Chain extenders containing three or more functional groups include alcohols containing three or more hydroxyl groups, such as trimethylolpropane and pentaerythritol, which are listed in the explanation of the chain extender described above.

Proportions

In the present invention, it is preferred that the antistatic agent is present at the surface of the coating layer, that the characteristic values based on surface element distribution measurement by ESCA satisfy the suitable relationships, and that the contact angle of the surface of the coating layer with respect to water falls within the suitable range. It is thus preferable to mainly control the polarity of the polyurethane resin and further adjust the ratio of the solids content of each of the cationic antistatic agent, the polyester resin, and the polyurethane resin to the total solids content of these components to control the polarity of the coating layer.

The content (mass %) of the cationic antistatic agent is preferably 3.5 to 7.0, and more preferably 4.0 to 5.5, based on the total solids content of the cationic antistatic agent, the polyester resin, and the polyurethane resin in the coating liquid taken as 100 mass %. By setting the content of the cationic antistatic agent within the above ranges, the proportion of nitrogen derived from the cationic antistatic agent containing nitrogen and the ratio of the proportion of nitrogen derived from the polyurethane resin to the proportion of nitrogen derived from the cationic antistatic agent based on surface element distribution measurement by ESCA can be controlled within the suitable ranges.

The content (mass %) of the polyester resin is preferably 25 to 80, more preferably 30 to 80, and particularly preferably 35 to 80, based on the total solids content of the cationic antistatic agent, the polyester resin, and the polyurethane resin in the coating liquid taken as 100 mass %. By setting the content of the polyester resin within the above ranges, adhesion between the coating layer and the polyester film substrate is ensured; the amounts of carboxyl groups, sulfonic acid metal salt groups, and phosphate groups, which are polar groups in the polyester resin that can interact with the cationic antistatic agent component, are controlled; and the proportion of nitrogen derived from the cationic antistatic agent containing nitrogen based on surface element distribution measurement by ESCA can be controlled within the suitable range.

The content (mass %) of the polyurethane resin is preferably 15 to 65, and more preferably 20 to 55, based on the total solids content of the cationic antistatic agent, the polyester resin, and the polyurethane resin in the coating liquid taken as 100 mass %. When the polyurethane resin content is low, the polyester resin content becomes relatively high, resulting in increased amounts of carboxyl groups, sulfonic acid metal salt groups, and phosphate groups, which are polar groups in the polyester resin in the coating layer. When the polyurethane resin content is high, the coating layer becomes less polar. Because of the decreased polarity of the coating layer, while the amount of the polyurethane component at the surface of the coating layer increases, the cationic antistatic agent becomes more likely to be present at the surface of the coating layer. That is, the amount of the cationic antistatic agent component at the surface of the coating layer also increases. By setting the content (mass %) of the polyurethane resin within the above ranges in view of these, the proportion of nitrogen derived from the cationic antistatic agent containing nitrogen and the ratio of the proportion of nitrogen derived from the polyurethane resin to the proportion of nitrogen derived from the cationic antistatic agent based on surface element distribution measurement by ESCA can be controlled within the suitable ranges.

Additives

The coating layer in the present invention may contain known additives, such as surfactants, antioxidants, heat-resistant stabilizers, weathering stabilizers, ultraviolet absorbers, organic lubricants, pigments, dyes, organic or inorganic particles, and nucleating agents, in the range in which the effect of the present invention is not impaired.

To reduce the glossiness on the surface of the coating layer, the coating layer may also contain inert particles.

Examples of the inert particles include particles of inorganic compounds such as titanium oxide, barium sulfate, calcium carbonate, calcium sulfate, silica, alumina, talc, kaolin, clay, calcium phosphate, mica, hectorite, zirconia, tungsten oxide, lithium fluoride, and calcium fluoride; particles of organic polymers such as polystyrene, polyacrylic, melamine, benzoguanamine, and silicone resin; and the like. These may be used singly, or in a combination of two or more.

The average particle size of the inert particles is preferably 0.1 to 2.4 µm, and more preferably 0.3 to 2.0 µm. If the average particle size of the inert particles is 0.1 µm or less, the glossiness on the film surface can increase. On the other hand, if it exceeds 2.4 µm, the particles tend to drop out of the coating layer, resulting in powder falling.

The inert particles can be added in the range in which the effect of the present invention is not impaired. To prevent the particles from dropping out of the coating layer and from undergoing powder falling, the solids content of the inert particles is preferably 0 to 70.0 mass %, more preferably 0 to 60.0 mass %, and even more preferably 0 to 55.0 mass %, of the total solids content of the coating layer.

The shape of the particles is not particularly limited as long as it satisfies the object of the present invention, and spherical particles and non-spherical particles having an irregular shape can be used. The particle size of particles having an irregular shape can be calculated as an equivalent circle diameter.

In the case of increasing the glossiness on the surface of the coating layer, it is preferred that the coating layer does not contain the particles.

Method for Producing White PET

The white coating polyester film of the present invention may be produced by any method, and the production method is not particularly limited. For example, the film can be produced in the following manner.

The film materials are sufficiently dried in vacuum, melted in an extruder, and then extruded from a T-die into a sheet form while applying static electricity to a rotating cooling metal roll to obtain an unstretched film.

In this case, it is preferable, in terms of homogeneous mixing, to prepare master batch polymers containing high concentrations of a white pigment and other additives separately in polyester resin in advance and dilute the master batch polymers by blending with polyester resin, rather than add a white pigment and other additives in powder form to the extruder and knead them. In order to achieve more sufficient homogeneous mixing of the film materials, the extruder is preferably a twin-screw extruder. It is also preferable to add an alkaline earth metal salt and/or an alkali metal salt, and phosphoric acid or a salt thereof in polymerizing the polyester in order to improve electrostatic adhesion. The addition of phosphoric acid or a salt thereof also has the effect of improving color tone (in particular, b-value).

In the present invention, the polyester film, which is a substrate, may have a single-layer structure or a laminated structure. The laminated structure has an advantage such that the formulations of the surface layers and the center layer can be designed in various manners according to the required function. When the polyester film, which is a substrate, has a laminated structure, it is most preferable to use a coextrusion method in which a resin for layer X and a resin for layer Y are separately fed to different extruders; for example, layer X and layer Y are laminated in this order in a molten state to form a two-layer structure, or layer X, layer Y, and layer X are laminated in this order in a molten state to form a three-layer structure; and then they are extruded from the same die.

The unstretched film obtained as described above is further biaxially oriented by, for example, stretching the film between rolls with different speeds (roll stretching), holding the film with clips and stretching the film (tenter stretching), or stretching the film with air pressure (inflation stretching).

The conditions for stretching and orientation of the unstretched film are closely related to the physical properties of the film. Below, the stretching and orientation conditions are described in view of a most commonly used sequential biaxial stretching method, in particular, a method comprising stretching an unstretched film in the longitudinal direction and then in the width direction, as an example.

First, in a longitudinal stretching step, a film is stretched between two or more rolls having different peripheral speeds. In this step, heating may be performed by a method that uses heating rolls, a method that uses a non-contact heating means, or a combination of these methods. Next, the uniaxially stretched film is introduced into a tenter and stretched 2.5- to 5-fold in the width direction at a temperature equal to or lower than (the melting point of polyester (Tm)−10° C.).

The biaxially stretched film obtained as described above is subjected to heat treatment as necessary. The heat treatment is preferably performed in a tenter at a temperature within the range of (the melting point of polyester (Tm)−50° C.) to Tm (° C.).

Method for Producing Cavity-Containing PET

In the readily adhesive white polyester film of the present invention, a thermoplastic resin that is incompatible with polyester resin may be dispersed in a polyester resin in the step of melting and extruding the film materials for molding. In the Examples of the present invention, the polyester resin and the thermoplastic resin incompatible with polyester resin supplied in pellet form were used. However, they are not limited to this.

Starting materials to be fed into an extruder so as to be melted and molded into a film form are prepared by mixing these resins in pellet form according to the desired formulation. However, when a polyester resin and a polyolefin resin, whose specific gravities greatly differ from each other, are used as the starting materials for the cavity-containing polyester film of the substrate of the present invention, it is preferable to strive to prevent segregation in the process of feeding pellets that have been mixed to an extruder. A suitable method for preventing segregation may be, for example, a method in which some or all of the starting material resins in combination are kneaded and pelletized to give master batch pellets in advance. This method was used in the Examples of the present invention; however, the method is not particularly limited to this as long as the effect of the present invention is not impaired.

In extrusion of such mixtures with an incompatible resin, even after resins are mixed and finely dispersed in the molten state, the resins have properties to act to reduce the interfacial energy of the resins, forming aggregates again. This phenomenon causes coarse dispersion of a cavity-forming agent in extrusion molding into an unstretched film, which prevents the desired physical properties from being achieved.

To avoid the above phenomenon, it is preferable to finely disperse a cavity-forming agent in advance using a twin-screw extruder, which has a higher mixing effect, when the film of the present invention is formed by molding. If this is difficult, it is also preferable to feed the starting resins from an extruder to a feed block or a die through a static mixer, as an auxiliary means. The static mixer for use may be a static mixer, an orifice, or the like. However, when these methods are used, it is preferable to avoid retention of thermally degraded resin in the melt line.

The incompatible resin, once dispersed in the form of fine particles in a polyester resin, tends to aggregate again with time in the molten state under low-shear conditions. The fundamental solution for this is to reduce the retention time in the melt line from the extruder to the die. In the present invention, the retention time in the melt line is preferably 30 minutes or less, and more preferably 15 minutes or less.

The conditions for stretching and orientation of the unstretched film obtained as described above are closely related to the physical properties of the film. Below, the stretching and orientation conditions are described in view of a most commonly used sequential biaxial stretching method, in particular, a method comprising stretching an unstretched film in the longitudinal direction and then in the width direction, as an example.

In a longitudinal stretching step, a film is stretched 2.5- to 5.0-fold in the longitudinal direction on rolls heated to 80 to 120° C. to obtain an uniaxially stretched film. Heating may be performed by a method that uses a heating roll, a method that uses a non-contact heating means, or a combination of these methods. Next, the uniaxially stretched film is introduced into a tenter and stretched 2.5- to 5-fold in the width direction at a temperature equal to or lower than (Tm−10° C.). The term "Tm" as used here represents the melting point of polyester.

The above biaxially stretched film is subjected to heat treatment as necessary. The heat treatment is preferably performed in a tenter at a temperature within the range of (Tm-60° C.) to Tm.

Preparation when Using Recycled Polyester Starting Materials

The polyester resin in the present invention may comprise a polyester resin recycled from plastic bottles. The crystallinity of polyesters used in plastic bottles is controlled to improve bottle moldability and appearance. As a result, polyester resins containing ester structural units derived from an isophthalic acid component and any diol component typified by ethylene glycol or diethylene glycol, in an amount of 0.5 mol % or more and 10.0 mol % or less of the entire ester structural units, may be used. Polyesters whose intrinsic viscosity is increased by performing solid-phase polymerization after liquid-phase polymerization may also be used. Polyester resin pellets recycled from plastic bottles are usually obtained by washing, pulverizing, melting by heating, and repelletizing plastic bottles; and further, solid-phase polymerization may be performed to increase the intrinsic viscosity. The intrinsic viscosity of the polyester resin recycled from plastic bottles is preferably within the range of 0.60 to 0.75 dl/g. An intrinsic viscosity of 0.60 dl/g or more is preferable because such an intrinsic viscosity makes it unlikely for the resulting film to break, thus making it easier to stably perform film production. An intrinsic viscosity of 0.75 dl/g or less is preferable because it prevents filtration pressure of the molten fluid from becoming overly high, thus making it easier to stably perform film production. In general, when a polyethylene terephthalate resin is obtained by solid-phase polymerization, the amount of oligomers contained in the resin, in particular, the amount of PET cyclic trimer, which is contained in the largest amount, is smaller than that of a polyethylene terephthalate resin obtained by liquid-phase polymerization. The upper limit of the amount of cyclic trimeric oligomer contained in the polyester resin recycled from plastic bottles is preferably 0.7 mass %, more preferably 0.5 mass %, and even more preferably 0.4 mass %.

The lower limit of the content of polyester resin recycled from plastic bottles in the cavity-containing polyester film is preferably 25 mass %, more preferably 30 mass %, and even more preferably 50 mass %. A content of 25 mass % or more is preferable because the amount of oligomers in the cavity-containing polyester film is reduced to suppress precipitation of oligomers. Further, to make efficient use of recycled resins, a higher content is preferable in terms of contribution to reduction of environmental load. The upper limit of the content of polyester resin recycled from plastic bottles is preferably 90 mass %, and more preferably 85 mass %.

The coating layer may be formed after the production of the film, or during the production process. In particular, in terms of productivity, the coating layer is preferably formed at any stage of the production process of the film; i.e., the coating layer is preferably formed by applying the coating liquid to at least one surface of the unstretched or uniaxially stretched PET film.

The coating liquid may be applied to the PET film by using a known method. Examples of the method include reverse roll coating, gravure coating, kiss coating, die coating, roll brush coating, spray coating, air knife coating, wire bar coating, a pipe doctor method, impregnation coating, curtain coating, and the like. These methods may be used singly or in combination for application of the coating liquid.

Drying after application of the coating liquid is preferably performed at a temperature of 80° C. to 150° C., more preferably 90° C. to 140° C., and particularly preferably 100° C. to 130° C., in order to allow the cationic antistatic agent component to bleed out on the surface of the coating layer and to allow the characteristic values based on surface element distribution measurement by ESCA to satisfy the suitable relationships. However, even at relatively low temperatures, it may be possible to allow the cationic antistatic agent component to bleed out on the surface of the coating layer and to allow the characteristic values based on surface element distribution measurement by ESCA to satisfy the suitable relationships, by increasing the drying time. Thus, the drying conditions are not limited to the above conditions.

In the present invention, the thickness of the coating layer is preferably within the range of 50 to 900 nm, more preferably 70 to 800 nm, even more preferably 100 to 600 nm, and particularly preferably 200 to 500 nm. As the thickness of the coating layer increases, the amount of the cationic antistatic agent component present per volume of the coating layer increases. This means that a larger amount of the cationic antistatic agent component will be present at the surface of the coating layer since the cationic antistatic agent component bleeds out on the surface of the coating layer. On the other hand, as the thickness of the coating layer decreases, the amount of the cationic antistatic agent component present per volume of the coating layer decreases. This means that the amount of the cationic antistatic agent component present at the surface of the coating layer is also reduced. Thus, the proportion of nitrogen derived from the cationic antistatic agent and the ratio of the proportion of nitrogen derived from the polyurethane resin to the proportion of nitrogen derived from the cationic antistatic agent based on surface element distribution measurement by ESCA can be controlled within the suitable ranges by controlling the thickness of the coating layer within the above ranges.

EXAMPLES

Next, the present invention is described below in more detail with reference to Examples and Comparative Examples. However, the present invention is not limited to the following Examples. First, the evaluation methods used in the present invention are explained below.

(1) Measurement of Proportion of Nitrogen (N and $N^+$) in the Surface Region

The surface composition was measured by ESCA. The device used for the measurement was K-Alpha$^+$ (produced by Thermo Fisher Scientific). Details of the measurement conditions are shown below. In the analysis, the background was removed by the Shirley method. The surface composition ratio was obtained by averaging the measurement results at three or more points, and calculating N (ionized nitrogen such as $N^+$) and N (non-ionized nitrogen such as C—N) by peak separation of an Nis spectrum. In the Nis spectrum, the peak near 402 eV represents N (ionized nitrogen such as $N^+$), whereas the peak near 400 eV represents N (non-ionized nitrogen such as C—N).

Measurement Condition

Excited X-ray: monochromatic Al Kα-ray
X-Ray output: 12 kV, 6 mA
Photoelectron escape angle: 90°
Spot size: 400 μm Φ
Pass energy: 50 eV
Step: 0.1 eV FIG. 1 is a graph showing analysis results of an Nis spectrum of the surface region of the readily adhesive white polyester film obtained in Example 1. The thin solid line represents actual measurement data of the Nis spectrum. The peaks obtained in the actual measurement spectrum were separated into multiple peaks, and the binding species corresponding to each peak was identified from the position and shape of the peak. Further, curve-fitting was performed on the peak derived from each binding species, and each peak area was calculated. The peak area of N (ionized nitrogen such as $N^+$) was defined as A (at %), and the peak area of N (nonionized nitrogen such as C—N) was defined as B (at %).

(2) Measurement of Contact Angle with Water

After the sample was allowed to stand in an atmosphere of 23° C. and 65% RH for 24 hours, the contact angle between the surface of the coating layer of the sample and water was measured with a contact angle meter (CA-X, produced by Kyowa Surface Science Co., Ltd.) in the same atmosphere using distilled water stored under the same conditions. The measurement was performed at 10 points, and the average of the measurements was defined as the contact angle data.

(3) Surface Specific Resistance Value of Coating Layer

After a readily adhesive white polyester film or a white laminated polyester film was allowed to stand in an atmosphere of 23° C. and 65% RH for 24 hours, the surface specific resistance value (Ω/□) of the film surface (the coating layer surface when a coating layer was formed) was measured with a surface resistance meter (Hiresta-IP, produced by Mitsubishi Yuka Kabushiki Kaisha) at an applied voltage of 500 V, and evaluated as follows.

A: The surface specific resistance value is less than $1 \times 10^{12}$ Ω/□, and assessed as particularly good.
B: The surface specific resistance value is $1 \times 10^{12}$ Ω/□ or more and less than $1 \times 10^{13}$ Ω/□, and assessed as good.
C: The surface specific resistance value is $1 \times 10^{13}$ Ω/□ or more, and assessed as poor.

(4) Screen Ink Adhesion

A print was formed on a coating layer of a readily adhesive white polyester film or a white laminated polyester film by using a UV-curable screen ink (trade name: TU240 FDSS 911 Black, produced by Toyo Ink Co., Ltd.) with a Tetron screen (#250 mesh). Subsequently, the film coated with the ink layer was irradiated with 500 mJ/cm$^2$ of UV light using a high-pressure mercury lamp to thereby cure the UV-curable screen ink, thus obtaining a printed film. Subsequently, a Nichiban cellophane adhesive tape (CT405AP-24) was cut into a piece with a width of 24 mm and a length of 50 mm, and completely adhered to the ink layer surface with a handy rubber roller so as not to allow air to enter the ink layer surface. The cellophane adhesive tape was then vertically peeled off, and the area with the remaining printing layer was observed in the region of 24 mm×50 mm and evaluated according to the following criteria. In the present invention, a score of 4 or higher was assessed as acceptable.

5: The area with the remaining printing layer is 99% or more of the total region.
4: The area with the remaining printing layer is 90% or more but less than 99% of the total region.
3: The area with the remaining printing layer is 80% or more but less than 90% of the total region.
2: The area with the remaining printing layer is 70% or more but less than 80% of the total region.
1: The area with the remaining printing layer is 60% or more but less than 70% of the total region.

(5) Adhesion to Thermal Transfer Ink Ribbon

A thermal transfer ribbon (B-110C resin-type black, produced by Ricoh Company, Ltd.) was attached to a BLP-323 produced by Bon Electric Co., Ltd. and used to print an arbitrarily created barcode pattern on the coating layer of the readily adhesive white polyester film or white laminated polyester film to obtain a printed film. Subsequently, a Nichiban cellophane adhesive tape (CT405AP-24) was cut into a piece with a width of 24 mm and a length of 50 mm, and completely adhered to the ink layer surface with a handy rubber roller so as not to allow air to enter the ink layer surface. The cellophane adhesive tape was then vertically peeled off, and the area with the remaining printing layer was observed in the region of 24 mm×50 mm and evaluated according to the following criteria. In the present invention, a score of 4 or higher was assessed as acceptable.

5: The area with the remaining printing layer is 99% or more of the total region.
4: The area with the remaining printing layer is 90% or more but less than 99% of the total region.
3: The area with the remaining printing layer is 80% or more but less than 90% of the total region.
2: The area with the remaining printing layer is 70% or more but less than 80% of the total region.
1: The area with the remaining printing layer is 60% or more but less than 70% of the total region.

(6) Adhesion to LBP Toner

Using an ApeosPort-V C3376 produced by Fuji Xerox Co., Ltd., an arbitrarily created pattern was printed on the coating layer of a readily adhesive white polyester film or a white laminated polyester film to obtain a printed film. Subsequently, a Nichiban cellophane adhesive tape (CT405AP-24) was cut into a piece with a width of 24 mm and a length of 50 mm, and completely adhered to the ink layer surface with a handy rubber roller so as not to allow air to enter the ink layer surface. The cellophane adhesive tape was then vertically peeled off, and the area with the remaining printing layer was observed in the region of 24 mm×50 mm and evaluated according to the following criteria. In the present invention, a score of 4 or higher was assessed as acceptable.

5: The area with the remaining printing layer is 99% or more of the total region.
4: The area with the remaining printing layer is 90% or more but less than 99% of the total region.

3: The area with the remaining printing layer is 80% or more but less than 90% of the total region.
2: The area with the remaining printing layer is 70% or more but less than 80% of the total region.
1: The area with the remaining printing layer is 60% or more but less than 70% of the total region.

(7) Adhesion to UV Offset Ink

A print was formed on a coating layer of a readily adhesive white polyester film or a white laminated polyester film by using a UV-curable offset ink (trade name: Best Cure UV161 Indigo S, produced by T&K Toka Co., Ltd.) with a printing machine (trade name: RI Tester, produced by Akira Seisakusho Co., Ltd.). Subsequently, 30 seconds after printing, the film coated with the ink layer was irradiated with UV light at 70 mJ/cm$^2$ using a high-pressure mercury lamp to thereby cure the UV-curable offset ink and obtain a printed film. Subsequently, a Nichiban cellophane adhesive tape (CT405AP-24) was cut into a piece with a width of 24 mm and a length of 50 mm, and completely adhered to the ink layer surface with a handy rubber roller so as not to allow air to enter the ink layer surface. The cellophane adhesive tape was then vertically peeled off, and the area with the remaining printing layer was observed in the region of 24 mm×50 mm and evaluated according to the following criteria. In the present invention, a score of 4 or higher was assessed as acceptable.

5: The area with the remaining printing layer is 99% or more of the total region.
4: The area with the remaining printing layer is 90% or more but less than 99% of the total region.
3: The area with the remaining printing layer is 80% or more but less than 90% of the total region.
2: The area with the remaining printing layer is 70% or more but less than 80% of the total region.
1: The area with the remaining printing layer is 60% or more but less than 70% of the total region.

(8) Adhesion to UV Offset Ink in High-Speed Printing

A print was formed on a coating layer of a readily adhesive white polyester film or a white laminated polyester film by using a UV-curable ink (trade name: Best Cure UV161 Indigo S, produced by T&K Toka Co., Ltd.) with a central impression printing machine. More specifically, after the amount of ink was measured with an anilox roll having a cell volume of 11 cm$^3$/m$^2$, the ink was transferred to a solid plate and then to the film. The ink transferred to the film surface was cured with a 160 W/cm metal halide UV lamp. The time from the ink transfer to the film to the UV light irradiation was 0.94 seconds. Subsequently, a Nichiban cellophane adhesive tape (CT405AP-24) was cut into a piece with a width of 24 mm and a length of 50 mm, and completely adhered to the ink layer surface with a handy rubber roller so as not to allow air to enter the ink layer surface. The cellophane adhesive tape was then peeled off vertically, and the area with the remaining printing layer was observed in the region of 24 mm×50 mm and evaluated according to the following criteria. In the present invention, a score of 4 or higher was assessed as acceptable.

5: The area with the remaining printing layer is 99% or more of the total region.
4: The area with the remaining printing layer is 90% or more but less than 99% of the total region.
3: The area with the remaining printing layer is 80% or more but less than 90% of the total region.
2: The area with the remaining printing layer is 70% or more but less than 80% of the total region.
1: The area with the remaining printing layer is 60% or more but less than 70% of the total region.

(9) Apparent Density

A film was cut into four square sheets (5.00 cm×5.00 cm) for use as samples. The four sample sheets were stacked on top of each other, and the entire thickness of the sheets was measured at 10 points with a micrometer to four significant digits to determine the average thickness of the stacked sample sheets. The average value was divided by 4 and rounded off to three decimal places to determine the average film thickness (t: μm) per sheet. The mass of the four sample sheets (w: g) was measured to four significant digits with an automatic balance, and the apparent density was determined according to the following formula. The apparent density was rounded to three significant digits.

$$\text{Apparent density (g/cm}^3\text{)}=w\times10^4/(5.00\times5.00\times t\times4)$$

(10) Thickness of Resin Solids in the Coating Layer

The thickness of the resin solids was calculated from the amount of coating liquid applied and the mass of the total resin solids content of the coating liquid.

(11) b-Value

The color b-value of reflection was measured with a color-difference meter (ZE6000, produced by Nippon Denshoku Industries Co., Ltd.) in accordance with JIS-8722.

Synthesis of Cationic Antistatic Agent Containing Nitrogen: A-1

Using 89 g of dimethylaminoethanol and 285 g of $C_{18}$ stearic acid, an esterification reaction was performed at 100° C. in a nitrogen atmosphere for 10 hours. Tetrahydrofuran was added as a solvent for quaternization reaction. A predetermined amount of dimethyl sulfate was added to the target amine, and the resulting mixture was allowed to react at 70° C. for about 10 hours. After the reaction, the solvent was removed by distillation under reduced pressure, and isopropanol was added to adjust the resulting mixture to a desired solids content. A solution A-1 of a cationic antistatic agent containing a quaternary ammonium salt in isopropanol was thus obtained.

Synthesis of Cationic Antistatic Agent Containing Nitrogen: A-2

Procedures were performed as in the preparation of A-1, except that 89 g of dimethylaminoethanol and 228 g of $C_{14}$ myristic acid were used. A solution A-2 of a cationic antistatic agent containing a quaternary ammonium salt was thus obtained.

Synthesis of Cationic Antistatic Agent Containing Nitrogen: A-3

Procedures were performed as in the preparation of A-1, except that using 89 g of dimethylaminoethanol and 354 g of $C_{23}$ tricosylic acid, an esterification reaction was performed at 200° C. in a nitrogen atmosphere for 10 hours, tetrahydrofuran was added as a quaternization solvent, a predetermined amount of dimethyl sulfate was added to the target amine, and the resulting mixture was allowed to react at 70° C. for about 10 hours. A solution A-3 of a cationic antistatic agent containing a quaternary ammonium salt in isopropanol was thus obtained.

Synthesis of Cationic Antistatic Agent Containing Nitrogen: A-4

A solution A-4 of a cationic antistatic agent containing a quaternary ammonium salt in isopropanol was obtained in the same manner as in the preparation of A-1 except that 116 g of N,N-dimethyl-1,3-propanediamine and 285 g of stearic acid were used.

Ammonium Salt of Polystyrene Sulfonic acid with Number Average Molecular Weight of 10,000: A-5

Isopropanol was added to an existing ammonium salt of polystyrene sulfonic acid having an average molecular weight of 10,000. A solution A-5 of an ammonium salt of polystyrene sulfonic acid in isopropanol was thus obtained.

Polymerization of Polyester Resin B-1

194.2 parts by mass of dimethyl terephthalate, 184.5 parts by mass of dimethyl isophthalate, 14.8 parts by mass of dimethyl-5-sodium sulfoisophthalate, 233.5 parts by mass of diethylene glycol, 136.6 parts by mass of ethylene glycol, and 0.2 parts by mass of tetra-n-butyl titanate were placed in a stainless steel autoclave equipped with a stirrer, a thermometer, and a partial reflux condenser. A transesterification reaction was performed at a temperature of 160 to 220° C. for 4 hours. Subsequently, the temperature was raised to 255° C., and the pressure of the reaction system was gradually reduced; and then a reaction was performed at a reduced pressure of 30 Pa for one hour and a half, thus obtaining a copolyester resin (B-1). The obtained copolyester resin (B-1) was pale yellow and transparent. The reduced viscosity of the copolyester resin (B-1) was measured to be 0.70 dl/g. The glass transition temperature as measured by DSC was 40° C.

Preparation of Aqueous Polyester Dispersion Bw-1

25 parts by mass of polyester resin B-1 and 10 parts by mass of ethylene glycol n-butyl ether were placed in a reactor equipped with a stirrer, a thermometer, and a reflux condenser. The resulting mixture was heated to 110° C. and stirred to dissolve the resin. After the resin was completely dissolved, 65 parts by mass of water was gradually added to the polyester solution while stirring. After the addition, the resulting liquid was cooled to room temperature while stirring. A milky-white aqueous polyester dispersion (Bw-1) with a solids content of 30.0 mass % was thus obtained.

Preparation of Polyester Resin Solution Bw-2

97 parts by mass of dimethyl terephthalate, 93 parts by mass of dimethyl isophthalate, 68 parts by mass of ethylene glycol, 116 parts by mass of diethylene glycol, 0.1 parts by mass of zinc acetate, and 0.1 parts by mass of antimony trioxide were placed in a reaction vessel. A transesterification reaction was performed at 180° C. for 3 hours. Next, 7.1 parts by mass of 5-sodium sulfoisophthalic acid was added, and an esterification reaction was performed at 240° C. for 1 hour, followed by a polycondensation reaction at 250° C. under reduced pressure (1.33-0.027 kPa) for 2 hours to obtain a polyester resin with a molecular weight of 22,000. 300 parts by mass of this polyester resin and 140 parts by mass of butyl cellosolve were stirred at 160° C. for 3 hours to obtain a viscous melt. Water was gradually added to the melt. After 1 hour, a uniform, light-white polyester resin solution with a solids content of 25.0 mass % was obtained.

Preparation of Urethane Resin Solution Having Polycarbonate Structure C-1

22 parts by mass of 4,4-dicyclohexylmethane diisocyanate, 20 parts by mass of polyethylene glycol monomethyl ether with an average molecular weight of 700, 53 parts of polyhexamethylene carbonate diol with an average molecular weight of 2100, 5 parts by mass of neopentyl glycol, and 84.00 parts by mass of acetone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached a predetermined amine equivalent. The temperature of the reaction mixture was then reduced to 50° C., and 3 parts by mass of methyl ethyl ketoxime was added dropwise. After the temperature of this reaction mixture was reduced to 40° C., a polyurethane prepolymer solution was obtained. Next, 450 g of water was added to a reaction vessel equipped with a homodisper capable of high-speed stirring, and the temperature was adjusted to 25° C. The polyurethane prepolymer solution was added thereto while mixing with stirring at 2000 min$^{-1}$ to obtain an aqueous dispersion. Acetone and a portion of water were then removed under reduced pressure. A water-dispersible urethane resin solution (C-1) with a solids content of 35.4 mass % was thus obtained.

Preparation of Urethane Resin Solution Having Polycarbonate Structure: C-2

22 parts by mass of 4,4-dicyclohexylmethane diisocyanate, 20 parts by mass of polyethylene glycol monomethyl ether with an average molecular weight of 700, 53 parts of polyhexamethylene carbonate diol with an average molecular weight of 2100, 5 parts by mass of neopentyl glycol, and 84.00 parts by mass of acetone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached a predetermined amine equivalent. Subsequently, 16 parts by mass of a polyisocyanate compound having an isocyanurate structure (Duranate TPA, produced by Asahi Kasei Corporation, trifunctional) prepared using hexamethylene diisocyanate as a starting material was added. The resulting mixture was stirred at 75° C. in a nitrogen atmosphere for 1 hour, and the reaction mixture was confirmed to have reached a predetermined amine equivalent. The temperature of the reaction mixture was then reduced to 50° C., and 7 parts by mass of methyl ethyl ketoxime was added dropwise. After the temperature of this reaction mixture was reduced to 40° C., a polyurethane prepolymer solution was obtained. Next, 450 g of water was added to a reaction vessel equipped with a homodisper capable of high-speed stirring and the temperature was adjusted to 25° C. The polyurethane prepolymer solution was added thereto while mixing with stirring at 2000 min$^{-1}$ to obtain an aqueous dispersion. Acetone and a portion of water were then removed under reduced pressure. A water-dispersible urethane resin solution (C-2) with a solids content of 35.4 mass % was thus obtained.

Polymerization of Urethane Resin Solution Having Polycarbonate Structure: C-3

31.0 parts by mass of hydrogenated m-xylylene diisocyanate, 7.0 parts by mass of dimethylolpropanoic acid, 60 parts by mass of polyhexamethylene carbonate diol having a number average molecular weight of 1800, 6 parts by mass of neopentyl glycol, and 84.00 parts by mass of acetone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached a predetermined amine equivalent. After the temperature of this reaction mixture was reduced to 40° C., 6.65 parts by mass of triethylamine was added to obtain a polyurethane prepolymer solution. Subsequently, 450 g of water was added to a reaction vessel equipped with a homodisper capable of high-speed stirring, and the temperature was adjusted to 25° C. The polyurethane prepolymer solution was added thereto while mixing with stirring at 2000 min$^{-1}$ to obtain an aqueous dispersion. Acetone and a portion of water were then removed under reduced pressure. A water-dispersible urethane resin solution (C-3) with a solids content of 35.0 mass % was thus obtained.

Polymerization of Urethane Resin Solution Having Polycarbonate Structure: C-4

22.0 parts by mass of 4,4-dicyclohexylmethane diisocyanate, 4.5 parts by mass of dimethylolbutanoic acid, 72.5 parts by mass of polyhexamethylene carbonate diol having a number average molecular weight of 2000, 1 part by mass of neopentyl glycol, and 84.00 parts by mass of acetone as a solvent were placed in a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached a predetermined amine equivalent. Subsequently, after the temperature of this reaction mixture was reduced to 40° C., 8.77 parts by mass of triethylamine was added to obtain a polyurethane prepolymer solution. Subsequently, 450 g of water was added to a reaction vessel equipped with a homodisper capable of high-speed stirring, and the temperature was adjusted to 25° C. The polyurethane prepolymer solution was added thereto while mixing with stirring at 2000 min$^{-1}$ to obtain an aqueous dispersion. Acetone and a portion of water were then removed under reduced pressure. A water-dispersible urethane resin solution (C-4) with a solids content of 37.0 mass % was thus obtained.

Polymerization of Urethane Resin Solution Having Polyester Structure C-5

83.4 parts by mass of hydrogenated m-xylylene diisocyanate, 16.9 parts by mass of dimethylolpropanoic acid, 28.4 parts by mass of 1,6-hexanediol, 151.0 parts by mass of polyester diol with an average molecular weight of 2000 comprising adipic acid and 1,4-butanediol, and 110 parts by mass of acetone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached a predetermined amine equivalent. Subsequently, after the temperature of this reaction mixture was reduced to 40° C., 13.3 parts by mass of triethylamine was added to obtain a polyurethane prepolymer solution. Subsequently, 500 g of water was added to a reaction vessel equipped with a homodisper capable of high-speed stirring, and the temperature was adjusted to 25° C. The polyurethane prepolymer solution was added thereto while mixing with stirring at 2000 min$^{-1}$ to obtain an aqueous dispersion. Acetone as a solvent was then removed under reduced pressure. The concentration was adjusted with water, thus preparing a polyurethane resin solution (C-5) with a solids content of 35.0 mass %.

Polymerization of Urethane Resin Solution Having Polyester Structure: C-6

82.8 parts by mass of hydrogenated m-xylylene diisocyanate, 25.0 parts by mass of dimethylolpropanoic acid, 2 parts by mass of 3-methyl-1,5-pentanediol, 150.0 parts by mass of a polyester diol composed of terephthalic acid/isophthalic acid//ethylene glycol/diethylene glycol=50/50//40/60 (molar ratio), and 110 parts by mass of acetone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached a predetermined amine equivalent. Subsequently, after the temperature of this reaction mixture was reduced to 40° C., 19.8 parts by mass of triethylamine was added to obtain a polyurethane prepolymer solution. Subsequently, 880 g of water was added to a reaction vessel equipped with a homodisper capable of high-speed stirring, and the temperature was adjusted to 25° C. The polyurethane prepolymer solution was added thereto while mixing with stirring at 2000 min$^{-1}$ to obtain an aqueous dispersion. Acetone as a solvent was then removed under reduced pressure. The concentration was adjusted with water, thus preparing a polyurethane resin solution (C-6) with a solids content of 30.0 mass %.

Polymerization of Urethane Resin Solution Having Polyester Structure: C-7

45.0 parts by mass of hydrogenated m-xylylene diisocyanate, 20.0 parts by mass of 1,6-hexanediol, 149.0 parts by mass of polyethylene glycol with an average molecular weight of 2000, and 110 parts by mass of acetone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours, and the reaction mixture was confirmed to have reached a predetermined amine equivalent. After the temperature of this reaction mixture was reduced to 40° C., 550 g of water was added to a reaction vessel equipped with a homodisper capable of high-speed stirring, and the temperature was adjusted to 25° C. The polyurethane prepolymer solution was added thereto while mixing with stirring at 2000 min$^{-1}$ to obtain an aqueous dispersion. Acetone as a solvent was then removed under reduced pressure. The concentration was adjusted with water, thus preparing a polyurethane resin solution (C-7) with a solids content of 30.0 mass %.

Preparation of Aqueous Polyurethane Blocked Isocyanate Dispersion Having Polyester Structure (C-8)

After 33.6 parts by weight of hexamethylene diisocyanate was added to 200 parts by weight of a polyester (molecular weight: 2000) of a 2-mol ethylene oxide adduct of bisphenol A and maleic acid, a reaction was allowed to proceed at 100° C. for 2 hours. Subsequently, the temperature of the reaction system was once reduced to 50° C., and 73 parts by weight of an aqueous 30% sodium bisulfite solution was added. The resulting mixture was stirred at 45° C. for 60 minutes, and then diluted with 718 parts by weight of water, thus obtaining an aqueous blocked polyisocyanate dispersion (C-8) with a solids content of 20.0 mass %. The blocked isocyanate crosslinking agent had two functional groups, and an NCO equivalent of 1300.

Example 1

(1) Preparation of Coating Liquid

The following components were mixed in a mixed solvent of water and isopropanol to prepare a coating liquid having a mass ratio of cationic antistatic agent containing nitrogen/polyester resin/a urethane resin of 4.0/57.6/38.4 based on solids content, and the coating liquid was applied to a thickness of 450 nm on a resin solids basis, thus obtaining a readily adhesive white polyester film.

Cationic antistatic agent solution containing nitrogen (A-1): 2.06 parts by mass
(solids content: 17.50 mass %)
Aqueous polyester dispersion (Bw-1): 17.00 parts by mass
Urethane resin solution (C-1): 9.60 parts by mass
Particles: 25.15 parts by mass
(silica particles with an average particle size of 0.45 µm, solids content: 40.00 mass %)
Surfactant: 0.15 parts by mass
(silicone-based, solids content: 10 mass %)

(2) Preparation of Master Pellet M1

60 mass % of a polymethylpentene resin with a melt viscosity ($\eta_O$) of 1,300 poise (DX820, produced by Mitsui Chemicals, Inc.), 20 mass % of a polystyrene resin with a melt viscosity ($\eta_s$) of 3,900 poise (G797N, produced by Japan PolyStyrene Inc.), and 20 mass % of a polypropylene resin with a melt viscosity of 2,000 poise (J104WC, produced by Grand Polymer) were mixed in pellet form. The resulting mixture was fed into a vented twin-screw extruder whose temperature had been adjusted to 285° C., and pre-kneaded. This molten resin was continuously fed into a vented single-screw extruder, kneaded, and extruded. The resulting strand was cooled and cut to prepare a master pellet (M1) as a cavity-forming agent.

(3) Preparation of Master Pellet M2-A

A mixture of 50 mass % of a polyethylene terephthalate resin with an intrinsic viscosity of 0.62 dl/g produced by a known method using an antimony catalyst and 50 mass % of anatase titanium dioxide particles with an average particle size of 0.3 μm (TA-300, produced by Fuji Titanium Industry Co., Ltd.) was fed into a vented twin-screw extruder, and pre-kneaded. This molten resin was continuously fed into a vented single-screw kneader, kneaded, and extruded. The resulting strand was cooled and cut to prepare a master pellet containing titanium dioxide (M2-A).

(4) Production of Readily Adhesive White Polyester Film (Film Substrate α-1)

Preparation of Film Starting Material D1-A 81 mass % of the polyethylene terephthalate resin with an intrinsic viscosity of 0.62 dl/g having been dried in vacuum at 140° C. for 8 hours, 9 mass % of the master pellet (M1) having been dried in vacuum at 90° C. for 4 hours, and 10 mass % of the master pellet (M2-A) were mixed in pellet form to obtain a film material (D1-A).

Preparation of Stretched Film

The film starting material (D1-A) was fed into an extruder for layer Y, whose temperature had been adjusted to 285° C. Separately, a mixture of 70 mass % of the same polyethylene terephthalate resin as that used for the preparation of the film material (D1-A), and 30 mass % of the master pellet (M2-A) was fed into an extruder for layer A, whose temperature had been adjusted to 290° C. The molten resin discharged from the extruder for layer Y was introduced to a feed block through an orifice, and the resin discharged from the extruder for layer A was introduced to the feed block through a static mixer. A layer formed of the film material (D1-A) (layer Y) and a layer formed of the polyethylene terephthalate resin and the master pellet (M2-A) (layer X) were laminated in the order of layer X, layer Y, and layer X.

The molten resins were coextruded in a sheet form from a T-die onto a cooling roll, whose temperature had been adjusted to 25° C., and adhered to and solidified on the roll by electrostatic application to form an unstretched film having a thickness of 510 μm. The discharge amount of each extruder was adjusted so that the thickness ratio of the layers was 1:8:1. The molten resins were retained in the melt line for about 12 minutes, and the shear rate obtained from the T-die was about 150/sec.

Preparation of Biaxially Stretched Film

The resulting unstretched film was uniformly heated to 65° C. using a heating roll, and stretched 3.4 times in the longitudinal direction between two pairs of nip rolls having different peripheral speeds (low-speed rolls: 2 m/min, high-speed rolls: 6.8 m/min). As auxiliary heaters for the film, infrared heaters equipped with a metal reflective film (rated output: 20 W/cm) were disposed in the middle of the nip rolls so that the heaters faced both surfaces of the film at a position 1 cm from the film surface, and the film was thus heated. On one surface of the uniaxially stretched film obtained in this manner, the coating liquid was applied by reverse kiss coating so that the thickness of the resin solids after stretching was 50 nm. After application, the resulting film was guided to a tenter, heated to 150° C. while drying, and stretched 3.7-fold in the transverse direction. With the width fixed, the film was heated at 220° C. for 5 seconds, and further relaxed by 4% at 200° C. in the width direction, thus obtaining a readily adhesive white polyester film having a thickness of 50 μm (the film substrate portion is referred to as α-1). The film had a b-value of 1.6.

Example 2

A readily adhesive white polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content.

Cationic antistatic agent solution containing nitrogen (A-1): 2.52 parts by mass
  (solid contents: 17.50 mass %)
Aqueous polyester dispersion (Bw-1): 17.00 parts by mass
Urethane resin solution (C-1): 9.60 parts by mass
Particles: 25.15 parts by mass
  (silica particles with an average particle size of 0.45 μm, solids content: 40.00 mass %)
Surfactant: 0.15 parts by mass
  (silicone-based, solids content: 10 mass %)

Example 3

A readily adhesive white polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.4/56.8/37.8 based on solids content.

Cationic antistatic agent solution containing nitrogen (A-1): 2.75 parts by mass
  (solid contents: 17.50 mass %)
Aqueous polyester dispersion (Bw-1): 17.00 parts by mass
Urethane resin solution (C-1): 9.60 parts by mass
Particles: 25.15 parts by mass
  (silica particles with an average particle size of 0.45 μm and a solids content of 40.00 mass %)
Surfactant: 0.15 parts by mass
  (silicone-based, solids content: 10 mass %)

Example 4

A readily adhesive white polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/76.0/19.0 based on solids content.

Cationic antistatic agent solution containing nitrogen (A-1): 2.52 parts by mass
  (solid contents: 17.50 mass %)

Aqueous polyester dispersion (Bw-1): 22.67 parts by mass
Urethane resin solution (C-1): 4.80 parts by mass
Particles: 25.15 parts by mass
    (silica particles with an average particle size of 0.45 µm, solids content: 40.00 mass %)
Surfactant: 0.15 parts by mass
    (silicone-based, solids content: 10 mass %)

Example 5

A readily adhesive white polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/38.0/57.0 based on solids content.
    Cationic antistatic agent solution containing nitrogen
        (A-1): 2.52 parts by mass
        (solid contents: 17.50 mass %)
    Aqueous polyester dispersion (Bw-1): 11.33 parts by mass
    Urethane resin solution (C-1): 14.41 parts by mass
    Particles: 25.15 parts by mass
        (silica particles with an average particle size of 0.45 µm, solids content: 40.00 mass %)
    Surfactant: 0.15 parts by mass
        (silicone-based, solids content: 10 mass %)

Example 6

A readily adhesive white polyester film was obtained in the same manner as in Example 1, except that the following components were mixed in a mixed solvent of water and isopropanol to prepare a coating liquid having a mass ratio of the cationic antistatic agent containing nitrogen/polyester resin/urethane resin solution of 5.0/57.0/38.0 based on solids content.
    Cationic antistatic agent solution containing nitrogen
        (A-2): 2.52 parts by mass
        (solid contents: 17.50 mass %)
    Aqueous polyester dispersion (Bw-1): 17.00 parts by mass
    Urethane resin solution (C-1): 9.60 parts by mass
    Particles: 25.15 parts by mass
        (silica particles with an average particle size of 0.45 µm, solids content: 40.00 mass %)
    Surfactant: 0.15 parts by mass
        (silicone-based, solids content: 10 mass %)

Example 7

A readily adhesive white polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content.
    Cationic antistatic agent solution containing nitrogen
        (A-4): 2.52 parts by mass
        (solid contents: 17.50 mass %)
    Aqueous polyester dispersion (Bw-1): 17.00 parts by mass
    Urethane resin solution (C-1): 9.60 parts by mass
    Particles: 25.15 parts by mass
        (silica particles with an average particle size of 0.45 µm, solids content: 40.00 mass %)
    Surfactant: 0.15 parts by mass
        (silicone-based, solids content: 10 mass %)

Example 8

A readily adhesive white polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content.
    Cationic antistatic agent solution containing nitrogen
        (A-1): 2.52 parts by mass
        (solids content: 17.50 mass %)
    Polyester resin solution (Bw-2): 20.40 parts by mass
    Urethane resin solution (C-1): 9.60 parts by mass
    Particles: 25.15 parts by mass
        (silica particles with an average particle size of 0.45 µm, solids content: 40.00 mass %)
    Surfactant: 0.15 parts by mass
        (silicone-based, solids content: 10 mass %)

Example 9

A readily adhesive white polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content.
    Cationic antistatic agent solution containing nitrogen
        (A-1): 2.52 parts by mass
        (solid contents: 17.50 mass %)
    Aqueous polyester dispersion (Bw-1): 17.00 parts by mass
    Urethane resin solution (C-2): 9.60 parts by mass
    Particles: 25.15 parts by mass
        (silica particles with an average particle size of 0.45 µm, solids content: 40.00 mass %)
    Surfactant: 0.15 parts by mass
        (silicone-based, solids content: 10 mass %)

Example 10

A readily adhesive white polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content.
    Cationic antistatic agent solution containing nitrogen
        (A-1): 2.52 parts by mass
        (solid contents: 17.50 mass %)
    Aqueous polyester dispersion (Bw-1): 17.00 parts by mass
    Urethane resin solution (C-3): 9.71 parts by mass
    Particles: 25.15 parts by mass
        (silica particles with an average particle size of 0.45 µm, solids content: 40.00 mass %)
    Surfactant: 0.15 parts by mass
        (silicone-based, solids content: 10 mass %)

Example 11

A readily adhesive white polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content.
Cationic antistatic agent solution containing nitrogen (A-1): 2.52 parts by mass
(solid contents: 17.50 mass %)
Aqueous polyester dispersion (Bw-1): 17.00 parts by mass
Urethane resin solution (C-5): 9.71 parts by mass
Particles: 25.15 parts by mass
(silica particles with an average particle size of 0.45 µm, solids content: 40.00 mass %)
Surfactant: 0.15 parts by mass
(silicone-based, solids content: 10 mass %)

Example 12

A readily adhesive white polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content, and that the coating liquid was applied to a thickness of 650 nm on a resin solids basis.
Cationic antistatic agent solution containing nitrogen (A-1): 3.30 parts by mass
(solid contents: 19.20 mass %)
Aqueous polyester dispersion (Bw-1): 30.00 parts by mass
Urethane resin solution (C-1): 16.95 parts by mass
Particles: 31.91 parts by mass
(benzoguanamine-formaldehyde condensate particles with an average particle size of 2 µm, solids content: 40.00 mass %)
Surfactant: 0.40 parts by mass
(silicone-based, solids content: 10 mass %)

Example 13

A readily adhesive white polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 6.5/60.7/32.8 based on solids content, and that the coating liquid was applied to a thickness of 50 nm on a resin solids basis.
Cationic antistatic agent solution containing nitrogen (A-1): 2.45 parts by mass
(solid contents: 15.8 mass %)
Aqueous polyester dispersion (Bw-1): 12.35 parts by mass
Urethane resin solution (C-1): 6.27 parts by mass
Surfactant: 0.25 parts by mass
(silicone-based, solids content: 10 mass %)

Example 14

A readily adhesive white polyester film was obtained in the same manner as in Example 1, except that the method for preparing a master pellet and the preparation of unstretched film in the preparation of a readily adhesive white polyester film were changed as follows. This film had a b-value of 1.6.
(1) Preparation of Master Pellet M2-B A mixture of 50 mass % of a polyethylene terephthalate resin with an intrinsic viscosity of 0.62 dl/g prepared by a known method using a phosphorus compound and an aluminum catalyst and 50 mass % of anatase titanium dioxide with an average particle size of 0.3 µm (TA-300, produced by Fuji Titanium Industry Co., Ltd.) was fed into a vented twin-screw extruder, and pre-kneaded. This molten resin was continuously fed into a vented single-screw kneader, kneaded, and extruded. The resulting strand was cooled and cut to prepare a master pellet containing titanium dioxide (M2-B).

(2) Production of Readily Adhesive White Polyester Film (Film Substrate α-2)
Preparation of Film Material D1-B 81 mass % of the polyethylene terephthalate resin with an intrinsic viscosity of 0.62 dl/g having been dried in vacuum at 140° C. for 8 hours, 9 mass % of the master pellet (M1) having been vacuum-dried at 90° C. for 4 hours, and 10 mass % of the master pellet (M2-B) were mixed in pellet form to obtain a film material (D1-B).

Preparation of Unstretched Film

The film material (D1-B) was fed into an extruder for layer Y, whose temperature had been adjusted to 285° C. Separately, a mixture of 70 mass % of the same polyethylene terephthalate resin as that used for the film material (D1-B) and 30 mass % of the master pellet (M2-B) was fed into an extruder for layer A, whose temperature had been adjusted to 290° C. The molten resin discharged from the extruder for layer Y was introduced to a feed block discharged through an orifice, and the resin discharged from the extruder for layer A was introduced to the feed block through a static mixer. A layer formed of the film material (D1-B) (layer Y) and a layer formed of the polyethylene terephthalate resin and the master pellet (M2-B) (layer X) were laminated in the order of layer X, layer Y, and layer X (the film substrate portion of the inline-coated biaxially stretched film is referred to as α-2).

Example 15

A readily adhesive white polyester film was obtained in the same manner as in Example 1, except that the method for preparing a master pellet and the preparation of a readily adhesive white polyester film were changed as follows. This film had a b-value of 1.5.
(3) Preparation of Master Pellet M3

50.0 mass % of anatase titanium dioxide particles with an average particle size of 0.3 µm (TA-300, produced by Fuji Titanium Industry Co., Ltd.) and 0.1 mass % of an optical brightening agent (Eastman Chemical Company, OB1) were mixed into 49.9 mass % of a polyethylene terephthalate resin with an intrinsic viscosity of 0.62 dl/g containing neither a white pigment nor inorganic particles, which was produced by a known method using a catalyst containing a phosphorus compound and aluminum. The resulting mixture was fed into a vented twin-screw extruder, and pre-kneaded. Subsequently, the molten resin was continuously fed into a vented single-screw extruder, kneaded, and extruded. The resulting strands were cooled and cut to prepare a master pellet (M3).

(2) Preparation of Master Pellet M4

A polyethylene terephthalate resin pellet (M4) with an intrinsic viscosity of 0.62 dl/g containing 0.7 mass % of silica particles with an average particle size of 1.8 µm was prepared using a catalyst containing a phosphorus compound and aluminum by a known method in which the silica particles were added during polymerization.
(3) Production of Readily Adhesive White Polyester Film
(B) Preparation of Film Materials D2 and D3

75 mass % of a polyethylene terephthalate resin with an intrinsic viscosity of 0.62 dl/g containing neither a white pigment nor inorganic particles was prepared using a catalyst containing a phosphorus compound and aluminum, and 25 mass % of the master pellet containing titanium dioxide particles (white pigment) (M3) were mixed in pellet form and dried in vacuum at 140° C. for 8 hours to prepare a film material (D2). Further, 30 mass % of the master pellet containing titanium dioxide (M3) and 70 mass % of the pellet containing silica particles (inorganic particles) (M4) were mixed in pellet form and dried in vacuum at 140° C. for 8 hours to prepare a film material (D3).

Preparation of Unstretched Film

The film materials were individually fed into different extruders, and a layer formed of a starting material (D2) (Y layer) and a layer formed of a starting material (D3) (X layer) were laminated in a molten state in the order of layer X, layer Y, and layer X using a feed block. The molten resins were coextruded from a T-die onto a rotating cooling metal roll whose temperature had been adjusted to 25° C. The discharge amount of each extruder was adjusted so that the thickness ratio of the layers was 1:8:1. The molten resins were retained in the melt line for about 12 minutes, and the shear rate obtained from the T-die was about 150/sec.

Preparation of Biaxially Stretched Film

The resulting unstretched film was uniformly heated to 66° C. using a heating roll and stretched 3.4 times in the longitudinal direction between two pairs of nip rolls having different peripheral speeds (low-speed rolls: 2 m/min, high-speed rolls: 6.8 m/min). As auxiliary heaters for the film, infrared heaters equipped with a metal reflective film (rated output: 20 W/cm) were disposed in the middle of the nip rolls so that the heaters faced both surfaces of the film at a position 1 cm from the film surface, and the film was thus heated. On one surface of the uniaxially stretched film obtained in this manner, the coating liquid was applied by reverse kiss coating so that the thickness of the resin solids before stretching was 450 μm. After application, the resulting film was guided to a tenter, heated to 150° C. while drying, and stretched 3.7-fold in the transverse direction. With the width fixed, the film was heated at 220° C. for 5 seconds, and further relaxed by 4% at 200° C. in the width direction, thus obtaining a readily adhesive white polyester film having a thickness of 50 μm (the film substrate portion is referred to as B).

Comparative Example 1

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 2.5/58.5/39.0 based on solids content.
  Cationic antistatic agent solution containing nitrogen (A-1): 1.26 parts by mass
    (solid contents: 17.50 mass %)
  Aqueous polyester dispersion (Bw-1): 17.00 parts by mass
  Urethane resin solution (C-1): 9.60 parts by mass
  Particles: 25.15 parts by mass
    (silica particles with an average particle size of 0.45 μm, solids content: 40.00 mass %)
  Surfactant: 0.15 parts by mass
    (silicone-based, solids content: 10 mass %)

Comparative Example 2

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 7.1/55.7/37.2 based on solids content.
  Cationic antistatic agent solution containing nitrogen (A-1): 3.72 parts by mass
    (solid contents: 17.50 mass %)
  Aqueous polyester dispersion (Bw-1): 17.00 parts by mass
  Urethane resin solution (C-1): 9.60 parts by mass
  Particles: 25.15 parts by mass
    (silica particles with an average particle size of 0.45 μm and a solids content of 40.00 mass %)
  Surfactant: 0.15 parts by mass
    (silicone-based, solids content: 10 mass %)

Comparative Example 3

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/85.5/9.5 based on solids content.
  Cationic antistatic agent solution containing nitrogen (A-1): 2.52 parts by mass
    (solid contents: 17.50 mass %)
  Aqueous polyester dispersion (Bw-1): 25.50 parts by mass
  Urethane resin solution (C-1): 2.40 parts by mass
  Particles: 25.15 parts by mass
    (silica particles with an average particle size of 0.45 μm and a solids content of 40.00 mass %)
  Surfactant: 0.15 parts by mass
    (silicone-based, solids content: 10 mass %)

Comparative Example 4

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/28.5/67.0 based on solids content.
  Cationic antistatic agent solution containing nitrogen (A-1): 2.52 parts by mass
    (solid contents: 17.50 mass %)
  Aqueous polyester dispersion (Bw-1): 8.50 parts by mass
  Urethane resin solution (C-1): 16.81 parts by mass
  Particles: 25.15 parts by mass
    (silica particles with an average particle size of 0.45 μm and a solids content of 40.00 mass %)
  Surfactant: 0.15 parts by mass
    (silicone-based, solids content: 10 mass %)
    (silicone-based, solids content: 10 mass %)

Comparative Example 5

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content.
- Cationic antistatic agent solution containing nitrogen (A-3): 2.52 parts by mass
  (solid contents: 17.50 mass %)
- Aqueous polyester dispersion (Bw-1): 17.00 parts by mass
- Urethane resin solution (C-1): 9.60 parts by mass
- Particles: 25.15 parts by mass
  (silica particles with an average particle size of 0.45 µm, solids content: 40.00 mass %)
- Surfactant: 0.15 parts by mass
  (silicone-based, solids content: 10 mass %)

Comparative Example 6

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content.
- Cationic antistatic agent solution containing nitrogen (A-5): 2.52 parts by mass
  (solids content: 17.50 mass %)
- Aqueous polyester dispersion (Bw-1): 17.00 parts by mass
- Urethane resin solution (C-1): 9.60 parts by mass
- Particles: 25.15 parts by mass
  (silica particles with an average particle size of 0.45 µm, solids content: 40.00 mass %)
- Surfactant: 0.15 parts by mass
  (silicone-based, solids content: 10 mass %)

Comparative Example 7

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content.
- Cationic antistatic agent solution containing nitrogen (A-1): 2.52 parts by mass
  (solid contents: 17.50 mass %)
- Aqueous polyester dispersion (Bw-1): 17.00 parts by mass
- Urethane resin solution (C-4): 9.19 parts by mass
- Particles: 25.15 parts by mass
  (silica particles with an average particle size of 0.45 µm, solids content: 40.00 mass %)
- Surfactant: 0.15 parts by mass
  (silicone-based, solids content: 10 mass %)

Comparative Example 8

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content.
- Cationic antistatic agent solution containing nitrogen (A-1): 2.52 parts by mass
  (solid contents: 17.50 mass %)
- Aqueous polyester dispersion (Bw-1): 17.00 parts by mass
- Urethane resin solution (C-6): 11.33 parts by mass
- Particles: 25.15 parts by mass
  (silica particles with an average particle size of 0.45 µm, solids content: 40.00 mass %)
- Surfactant: 0.15 parts by mass
  (silicone-based, solids content: 10 mass %)

Comparative Example 9

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content.
- Cationic antistatic agent solution containing nitrogen (A-1): 2.52 parts by mass
  (solid contents: 17.50 mass %)
- Aqueous polyester dispersion (Bw-1): 17.00 parts by mass
- Urethane resin solution (C-7): 11.33 parts by mass
- Particles: 25.15 parts by mass
  (silica particles with an average particle size of 0.45 µm, solids content: 40.00 mass %)
- Surfactant: 0.15 parts by mass
  (silicone-based, solids content: 10 mass %)

Comparative Example 10

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.8/33.0/61.2 based on solids content.
- Cationic antistatic agent solution containing nitrogen (A-1): 2.83 parts by mass
  (solid contents: 17.50 mass %)
- Aqueous polyester dispersion (Bw-1): 9.33 parts by mass
- Urethane resin solution (C-8): 26.00 parts by mass
- Particles (i): 16.31 parts by mass
  (silica particles with an average particle size of 0.45 µm, solids content: 40.00 mass %)
- Particles (ii): 5.44 parts by mass
  (silica particles with an average particle size of 1.00 µm, solids content: 40.00 mass %)
- Surfactant: 0.15 parts by mass
  (silicone-based, solids content: 10 mass %)

Comparative Example 11

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.8/33.0/61.2 based on solids content, and that the coating liquid was applied to a thickness of 650 nm on a resin solids basis.
  Cationic antistatic agent solution containing nitrogen (A-1): 2.91 parts by mass
    (solid contents: 19.20 mass %)
  Aqueous polyester dispersion (Bw-1): 11.67 parts by mass
  Urethane resin solution (C-8): 32.50 parts by mass
  Particles: 21.27 parts by mass
    (benzoguanamine particles with an average particle size of 2.00 μm, solids content: 40.00 mass %)
  Surfactant: 0.45 parts by mass
    (silicone-based, solids content: 10 mass %)

Comparative Example 12

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content, and that the coating liquid was applied to a thickness of 950 nm on a resin solids basis.
  Cationic antistatic agent solution containing nitrogen (A-1): 2.52 parts by mass
    (solid contents: 17.50 mass %)
  Aqueous polyester dispersion (Bw-1): 17.00 parts by mass
  Urethane resin solution (C-1): 9.60 parts by mass
  Particles: 25.15 parts by mass
    (silica particles with an average particle size of 45 μm, solids content: 40.00 mass %)
  Surfactant: 0.15 parts by mass
    (silicone-based, solids content: 10 mass %)

Comparative Example 13

A white laminated polyester film was obtained in the same manner as in Example 1, except that the following components were mixed in a mixed solvent of water and isopropanol to prepare a coating liquid having a mass ratio of cationic antistatic agent containing nitrogen/polyester resin/urethane resin solution of 5.0/57.0/38.0 based on solids content, and that the coating liquid was applied to a thickness of 25 nm on a resin solids basis.
  Cationic antistatic agent solution containing nitrogen (A-1): 2.52 parts by mass
    (solid contents: 17.50 mass %)
  Aqueous polyester dispersion (Bw-1): 17.00 parts by mass
  Urethane resin solution (C-1): 9.60 parts by mass
  Surfactant: 0.15 parts by mass
    (silicone-based, solids content: 10 mass %)

Tables 1 and 2 summarize the evaluation results of the Examples and Comparative Examples.

TABLE 1

| | Components of the coating liquid | | | | Mass ratio based on solids content (mass % of the solids content of each component, based on the total solids content of the antistatic agent, polyester resin, and polyurethane resin) | | | Thickness of resin solids of the coating layer (nm) | Surface element distribution measurement by ESCA, Characteristic values | | Contact angle with water (°) |
|---|---|---|---|---|---|---|---|---|---|---|---|
| | Substrate film | Antistatic agent | Polyester resin | Polyurethane resin | Antistatic agent | Polyester resin | Polyurethane resin | | A (at %) | B/A (—) | |
| Example 1 | α-1 | A-1 | Bw-1 | C-1 | 4.0 | 57.6 | 38.4 | 450 | 0.5 | 3.2 | 68 |
| Example 2 | α-1 | A-1 | Bw-1 | C-1 | 5.0 | 57.0 | 38.0 | 450 | 0.5 | 3.4 | 67 |
| Example 3 | α-1 | A-1 | Bw-1 | C-1 | 5.4 | 56.8 | 37.8 | 450 | 0.7 | 2.1 | 67 |
| Example 4 | α-1 | A-1 | Bw-1 | C-1 | 5.0 | 76.0 | 19.0 | 450 | 0.5 | 3.2 | 67 |
| Example 5 | α-1 | A-1 | Bw-1 | C-1 | 5.0 | 38.0 | 57.0 | 450 | 0.7 | 2.1 | 66 |
| Example 6 | α-1 | A-2 | Bw-1 | C-1 | 5.0 | 57.0 | 38.0 | 450 | 0.5 | 4.0 | 63 |
| Example 7 | α-1 | A-4 | Bw-1 | C-1 | 5.0 | 57.0 | 38.0 | 450 | 0.5 | 3.4 | 67 |
| Example 8 | α-1 | A-1 | Bw-2 | C-1 | 5.0 | 57.0 | 38.0 | 450 | 0.8 | 2.3 | 67 |
| Example 9 | α-1 | A-1 | Bw-1 | C-2 | 5.0 | 57.0 | 38.0 | 450 | 0.5 | 3.4 | 67 |
| Example 10 | α-1 | A-1 | Bw-1 | C-3 | 5.0 | 57.0 | 38.0 | 450 | 0.7 | 2.4 | 61 |
| Example 11 | α-1 | A-1 | Bw-1 | C-5 | 5.0 | 57.0 | 38.0 | 450 | 0.6 | 2.7 | 58 |
| Example 12 | α-1 | A-1 | Bw-1 | C-1 | 5.0 | 57.0 | 38.0 | 650 | 0.6 | 4.3 | 56 |
| Example 13 | α-1 | A-1 | Bw-1 | C-1 | 5.0 | 57.0 | 38.0 | 50 | 0.8 | 2.1 | 59 |
| Example 14 | α-2 | A-1 | Bw-1 | C-1 | 4.0 | 57.6 | 38.4 | 450 | 0.5 | 3.2 | 68 |
| Example 15 | β | A-1 | Bw-1 | C-1 | 4.0 | 57.6 | 38.4 | 450 | 0.5 | 3.2 | 68 |
| Comp. Ex. 1 | α-1 | A-1 | Bw-1 | C-1 | 2.5 | 58.5 | 39.0 | 450 | 0.3 | 6.0 | 70 |
| Comp. Ex. 2 | α-1 | A-1 | Bw-1 | C-1 | 7.1 | 55.7 | 37.2 | 450 | 1.0 | 1.2 | 64 |
| Comp. Ex. 3 | α-1 | A-1 | Bw-1 | C-1 | 5.0 | 85.5 | 9.5 | 450 | 0.4 | 5.3 | 68 |
| Comp. Ex. 4 | α-1 | A-1 | Bw-1 | C-1 | 5.0 | 28.5 | 67.0 | 450 | 0.8 | 1.5 | 65 |
| Comp. Ex. 5 | α-1 | A-3 | Bw-1 | C-1 | 5.0 | 57.0 | 38.0 | 450 | 0.3 | 7.0 | 65 |
| Comp. Ex. 6 | α-1 | A-5 | Bw-1 | C-1 | 5.0 | 57.0 | 38.0 | 450 | — | — | 60 |
| Comp. Ex. 7 | α-1 | A-1 | Bw-1 | C-4 | 5.0 | 57.0 | 38.0 | 450 | 0.5 | 3.8 | 73 |
| Comp. Ex. 8 | α-1 | A-1 | Bw-1 | C-6 | 5.0 | 57.0 | 38.0 | 450 | 0.7 | 1.3 | 69 |
| Comp. Ex. 9 | α-1 | A-1 | Bw-1 | C-7 | 5.0 | 57.0 | 38.0 | 450 | 0.4 | 3.8 | 61 |
| Comp. Ex. 10 | α-1 | A-1 | Bw-1 | C-8 | 5.8 | 33.0 | 61.2 | 450 | 0.9 | 2.3 | 49 |
| Comp. Ex. 11 | α-1 | A-1 | Bw-1 | C-8 | 5.8 | 33.0 | 61.2 | 650 | 0.8 | 2.5 | 40 |
| Comp. Ex. 12 | α-1 | A-1 | Bw-1 | C-1 | 5.0 | 57.0 | 38.0 | 950 | 1.1 | 1.3 | 56 |
| Comp. Ex. 13 | α-1 | A-1 | Bw-1 | C-1 | 5.0 | 57.0 | 38.0 | 25 | 0.3 | 5.7 | 68 |

TABLE 2

| | Surface resistance value | Evaluation of ink adhesion | | | | |
|---|---|---|---|---|---|---|
| | | Screen ink | TTR | LBP toner | UV offset ink (RI tester) | UV offset ink (printer) |
| Example 1 | B | 5 | 5 | 4 | 5 | 5 |
| Example 2 | A | 5 | 5 | 5 | 5 | 5 |
| Example 3 | A | 5 | 5 | 5 | 5 | 4 |
| Example 4 | B | 5 | 5 | 5 | 5 | 5 |
| Example 5 | A | 5 | 5 | 5 | 5 | 4 |
| Example 6 | B | 5 | 5 | 4 | 5 | 5 |
| Example 7 | A | 5 | 5 | 5 | 5 | 5 |
| Example 8 | A | 5 | 5 | 5 | 5 | 5 |
| Example 9 | A | 5 | 5 | 5 | 5 | 5 |
| Example 10 | A | 5 | 5 | 5 | 5 | 5 |
| Example 11 | B | 5 | 5 | 4 | 5 | 4 |
| Example 12 | A | 5 | 5 | 5 | 5 | 5 |
| Example 13 | B | 5 | 5 | 5 | 5 | 5 |
| Example 14 | B | 5 | 5 | 4 | 5 | 5 |
| Example 15 | B | 5 | 5 | 4 | 5 | 5 |
| Comp. Ex. 1 | C | 5 | 5 | 3 | 5 | 5 |
| Comp. Ex. 2 | A | 5 | 5 | 5 | 3 | 1 |
| Comp. Ex. 3 | C | 4 | 4 | 2 | 4 | 4 |
| Comp. Ex. 4 | A | 5 | 5 | 5 | 5 | 3 |
| Comp. Ex. 5 | C | 5 | 5 | 4 | 5 | 5 |
| Comp. Ex. 6 | B | 5 | 5 | 5 | 5 | 3 |
| Comp. Ex. 7 | C | 5 | 5 | 4 | 5 | 5 |
| Comp. Ex. 8 | B | 5 | 5 | 4 | 3 | 3 |
| Comp. Ex. 9 | C | 5 | 5 | 4 | 4 | 3 |
| Comp. Ex. 10 | A | 5 | 5 | 5 | 4 | 2 |
| Comp. Ex. 11 | A | 5 | 5 | 5 | 4 | 1 |
| Comp. Ex. 12 | A | 5 | 5 | 5 | 3 | 1 |
| Comp. Ex. 13 | C | 3 | 3 | 2 | 3 | 1 |

The results show that the readily adhesive white polyester films obtained in the Examples have excellent antistatic properties and excellent adhesion to various inks and toners, in particular, excellent adhesion to UV-curable inks in high-speed printing. In contrast, the films obtained in the Comparative Examples are inadequate in one of the following properties of the coating layer: A value, B/A value, and contact angle with water, which results in at least either unsatisfactory antistatic properties or poor adhesion to inks and toners.

INDUSTRIAL AVAILABILITY

The present invention makes it possible to provide a readily adhesive white polyester film that is suitable for use in the field of labeling applications etc.

REFERENCE SIGNS LIST

Thin solid line: actual measurement data of the N1s spectrum of a coating layer surface.
Dotted line: a curve showing an ionized nitrogen peak obtained by peak separation of the N1s spectrum.
Dashed line: a curve showing a non-ionized nitrogen peak obtained by peak separation of the N1s spectrum.
(1): Ionized nitrogen peak
(2): Non-ionized nitrogen peak

The invention claimed is:

1. A readily adhesive white polyester film comprising a polyester film substrate and a coating layer on at least one surface of the polyester film substrate,
the coating layer comprising a cationic antistatic agent containing nitrogen, a polyester resin, and a polyurethane resin,
the proportion A (at %) of nitrogen derived from the antistatic agent and the proportion B (at %) of nitrogen derived from the polyurethane resin based on surface element distribution measurement by X-ray photoelectron spectroscopy in the coating layer satisfying the following formulas (i) and (ii), and
a surface of the coating layer having a contact angle with respect to water of 50° to 70°:

$$A \text{ (at \%)} > 0.4 \tag{i}$$

$$2.0 \leq B/A \leq 5.0. \tag{ii}$$

2. The readily adhesive white polyester film according to claim 1, wherein the polyester film substrate comprises inorganic particles and/or a thermoplastic resin that is incompatible with polyester resin.

* * * * *